United States Patent
Hofmann et al.

(10) Patent No.: US 9,101,979 B2
(45) Date of Patent: Aug. 11, 2015

(54) METHODS FOR FABRICATING GRADIENT ALLOY ARTICLES WITH MULTI-FUNCTIONAL PROPERTIES

(71) Applicant: California Institute of Technology, Pasadena, CA (US)

(72) Inventors: Douglas C. Hofmann, Altadena, CA (US); John Paul C. Borgonia, Pasadena, CA (US); Robert P. Dillon, Costa Mesa, CA (US); Eric J. Suh, Pasadena, CA (US); Jerry L. Mulder, La Crescenta, CA (US); Paul B. Gardner, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 487 days.

(21) Appl. No.: 13/664,285

(22) Filed: Oct. 30, 2012

(65) Prior Publication Data

US 2015/0044084 A1 Feb. 12, 2015

Related U.S. Application Data

(60) Provisional application No. 61/553,860, filed on Oct. 31, 2011.

(51) Int. Cl.
*B22F 7/02* (2006.01)
*C22C 38/08* (2006.01)
(Continued)

(52) U.S. Cl.
CPC ... *B22F 7/02* (2013.01); *B05D 1/18* (2013.01); *B05D 1/36* (2013.01); *B05D 7/00* (2013.01); *B22F 7/04* (2013.01); *B23K 20/10* (2013.01);
(Continued)

(58) Field of Classification Search
CPC ........ B22F 7/02; C22C 38/08; C21D 2251/02
USPC .............................................. 419/2
See application file for complete search history.

(56) References Cited

U.S. PATENT DOCUMENTS 5,810,924 A   9/1998  Legoues et al.
2003/0231973 A1  12/2003  Krumpelt et al.
(Continued)

FOREIGN PATENT DOCUMENTS

WO   2013112217 A2   8/2013
WO   2013112217 A3   10/2013

OTHER PUBLICATIONS

Griffith et al., "Understanding the microstructure and Properties of Components Fabricated by Laser Engineered Net Shaping (Lens)", Sandia Report, Nov. 2007, SAND2007-7832, 14 pgs.
(Continued)

*Primary Examiner* — Weiping Zhu
(74) *Attorney, Agent, or Firm* — KPPB LLP

(57) ABSTRACT

Systems and methods for fabricating multi-functional articles comprised of additively formed gradient materials are provided. The fabrication of multi-functional articles using the additive deposition of gradient alloys represents a paradigm shift from the traditional way that metal alloys and metal/metal alloy parts are fabricated. Since a gradient alloy that transitions from one metal to a different metal cannot be fabricated through any conventional metallurgy techniques, the technique presents many applications. Moreover, the embodiments described identify a broad range of properties and applications.

25 Claims, 16 Drawing Sheets

(51) Int. Cl.
- C22C 38/40 (2006.01)
- B32B 15/01 (2006.01)
- C22C 38/14 (2006.01)
- B22F 7/04 (2006.01)
- B05D 1/18 (2006.01)
- B05D 1/36 (2006.01)
- B05D 7/00 (2006.01)
- B23K 20/10 (2006.01)
- B23K 26/34 (2014.01)
- B23K 31/02 (2006.01)
- C04B 35/01 (2006.01)
- C04B 35/64 (2006.01)
- C21D 1/00 (2006.01)
- C23C 4/12 (2006.01)

(52) U.S. Cl.
CPC ............... *B23K 26/345* (2013.01); *B23K 31/02* (2013.01); *B32B 15/01* (2013.01); *B32B 15/011* (2013.01); *B32B 15/013* (2013.01); *C04B 35/01* (2013.01); *C04B 35/64* (2013.01); *C21D 1/00* (2013.01); *C22C 38/08* (2013.01); *C22C 38/14* (2013.01); *C22C 38/40* (2013.01); *C23C 4/12* (2013.01); *B22F 2207/01* (2013.01); *B22F 2999/00* (2013.01); *C04B 2235/75* (2013.01); *C21D 2201/03* (2013.01); *C21D 2251/02* (2013.01)

(56) References Cited

U.S. PATENT DOCUMENTS

| | | |
|---|---|---|
| 2006/0115588 A1 | 6/2006 | Takeuchi et al. |
| 2006/0234081 A1 | 10/2006 | Inoue et al. |
| 2010/0101368 A1 | 4/2010 | Fang et al. |

OTHER PUBLICATIONS

Lewis et al., "Practical considerations and capabilities for laser assisted direct metal deposition", Materials and Design, 2000, vol. 21, pp. 417-423.

Smugeresky et al., "New Low Cost Material Development Technique for Advancing Rapid Prototyping Manufacturing Technology", Sandia Report, Nov. 2007, SAND2007-7832, 39 pgs.

International Search Report and Written Opinion for International Application PCT/US2012/062618, completed Aug. 13, 2013, 7 pgs.

METHODS FOR FABRICATING GRADIENT ALLOY ARTICLES WITH MULTI-FUNCTIONAL PROPERTIES

CROSS-REFERENCE TO RELATED APPLICATIONS

The current application claims priority to U.S. Provisional Application No. 61/553,860, filed Oct. 31, 2011, the disclosure of which is incorporated herein by reference.

STATEMENT OF FEDERAL RIGHTS

The invention described herein was made in the performance of work under a NASA contract, and is subject to the provisions of Public Law 96-517 (35 USC 202) in which the Contractor has elected to retain title.

FIELD OF THE INVENTION

The current invention is directed to methods of fabricating gradient alloy articles having multi-functional properties, and applications for using such gradient alloys.

BACKGROUND OF THE INVENTION

The development of new metal alloys (a field called metallurgy) is limited by the foundry processes used for alloying. New metal alloys must typically be melted at high temperatures, allowed to mix to promote homogeneity, and are then cast into billets of a single composition. Due to the nature of conventional homogenous alloying, it is extremely difficult to fabricate a piece of metal that has a gradient of compositions from one metal to another. Yet such gradient properties would be extremely useful, based on the wide assortments of "post processing" methods often employed to locally change the properties of a metal alloy. For example, the contact surfaces on the teeth of metal gears need to be hard to avoid abrasive wearing while the bulk of the gear needs to be tough to support the loads without failing. To do this, the teeth in some cases are infused with carbon in a process called "case hardening" to change the properties only in the desired area. In another example, shot peening the surface of a brittle metal may be used to improve the fatigue properties locally near the surface by creating a gradient of mechanical properties from the interior of the part to the exterior. While these post-processing techniques are able to modify some properties of some materials, there are substantial limitations both as to the types of properties that can be modified, and to the materials that can undergo such modification.

Recently, Additive Manufacturing (AM) techniques have been developed that may shift the paradigm of traditional metal production. These AM processes are typically designed as 3D printing techniques for fabricating metal alloys into net-shapes, as is common with plastics. Traditionally, a complex part is fabricated either by molten casting or molding, or from a solid piece of metal by machining a large billet whose overall dimension is larger than the outer-most piece of the finished hardware. AM techniques build the part up by depositing material layer-by-layer using computer aided processing. Only the material needed in the final part is deposited, thus eliminating the need for complex machining.

One AM technology that has promise is Laser Engineered Net Shaping (LENS). LENS is an additive manufacturing process for fabricating metal parts from a Computer Aided Design (CAD) solid model. It is very similar to other rapid prototyping techniques in that it fabricates a solid part by layers at a time, however, the LENS technology is unique in that it is able to produce fully dense parts with material properties similar to its wrought counterparts. The novelty of LENS lies in its multi-nozzle capability and precision deposition.

The LENS process fabricates a part by a laser head emitting a beam onto a substrate mounted on a worktable, simultaneously injecting metal powder into the molten pool from its powder delivery nozzles. These nozzles are connected to a hopper (a maximum of four hoppers using currently available equipment), delivering the powdered metal to the work zone. Either substrate or laser head is moved in the X-Y direction to deposit a thin layer of metal, creating the geometry of a part. After a layer is deposited, the laser head and powder nozzles move incrementally in the positive Z-direction, creating a 3-dimensional part. (See, Griffith, M. L. et al., Sandia Report—SAND2000-1000C: 18 May 2000, the disclosure of which is incorporated herein by reference.) Because multiple nozzles and multiple powder feedstocks may be used, LENS has the ability to mix powder streams of different materials, thereby producing components with precise composition control. It has been theorized that this capability to alter composition may be useful for minimizing the stress effects of mismatched coefficients of thermal expansion between dissimilar materials during thermal cycle and optimizing the mechanical properties critical to component performance.

A number of groups have identified the LENS technique's potential to allow for changing geometric properties (surface finish, part size, etc.) and material properties (coefficient of thermal expansion, tensile strength, etc.) within an article of manufacture to create truly multi-functional graded materials and parts. (See, Griffith, M. L. et al., cited above.) For example, LENS and other direct laser metal deposition techniques have been used to fabricate functionally graded materials for metallurgical research. Many graded materials have been deposited, such as iron-to-manganese and iron-to-nickel to study LENS process variables (laser power, powder feeder speeds, layer thickness, etc.) by analyzing melt-pool size and porosity; and Titanium-to-niobium graded compositions were 3D printed to present the capability of controlling properties of fabricated parts. (Atwood, C. J.; et al., Sandia Report—SAND2007-7832: November 2007; and Lewis, G. K., and Schlienger, E., *Materials and Design,* 21, 417, 2000, the disclosures of which are incorporated herein by reference.) However, these studies invariably stress the singular and non-generalizable nature of these results.

Accordingly, a need exists for a generalized technique that would allow a manufacturer to identify a set of different desired physical/chemical/electrical/magnetic/properties within a part, identify the terminal materials that would be needed to generate those properties, and then formulate a method of determining the necessary material gradients to allow for the changes in physical properties.

SUMMARY OF THE INVENTION

Embodiments are directed to systems and methods for fabricating multi-functional articles comprised of additively formed gradient materials.

Some embodiments are directed to methods or systems for fabricating a multi-functional multilayer article including:
  determining a shape for the article and defining at least two spatially separated regions on said article, said two regions to be formed of at least two distinct materials being joined by at least one compositional gradient transition region;

mapping a compositional gradient pathway onto the article between the at least two regions such that the at least one compositional gradient transition region substantially excludes any undesirable compositional phases; and forming the article, wherein at least the at least one compositional gradient transition region comprises a plurality of distinct gradient layers formed by incrementally adjusting the compositional ratio between the at least two distinct materials.

In other embodiments of the methods and systems, the incremental adjustment between the at least two distinct materials includes the use of compositional increments between 0.1 and 50%.

In still other embodiments of the methods and systems, the at least one gradient transition region includes a direct compositional transition from one distinct material to another.

In yet other embodiments of the methods and systems, the at least one gradient transition region includes a multi-stage gradient wherein the gradient region includes both incremental compositional steps and direct stepwise compositional transitions.

In still yet other embodiments of the methods and systems, the gradient transition region includes transitions to and from a separate distinct material.

In still yet other embodiments of the methods and systems, the width of each gradient layer is between 1 micrometer and 1 centimeter.

In still yet other embodiments of the methods and systems, there are at least three distinct materials each separated by at least one distinct compositional gradient region.

In still yet other embodiments of the methods and systems, there are at least two distinct compositional gradient transition regions between each distinct material.

In still yet other embodiments of the methods and systems, the at least one gradient transition region is formed additively, by the addition of one gradient layer at a time. In some such embodiments, the additive process is selected from laser deposition, wire-fed freeform, ultrasonic additive manufacturing, sintering blended powders, thermal spray coating, melt pool coating, chemical desegregation, and dip coating.

In still yet other embodiments of the methods and systems, the compositional gradient pathway is determined by plotting a compositional line along a phase diagram of the at least two distinct materials. In some such embodiments, the line is continuous, and is one of either a straight or a curve line. In other such embodiments, the line is discontinuous. In still other such embodiments, the phase diagram of a distinct material with greater than three constituents is simplified into a ternary phase diagram based on the three highest concentration constituents of said distinct material. In yet other such embodiments, the phase diagram is a quasi-phase diagram representing more than three separate constituents.

In still yet other embodiments, the methods and systems include determining the compositional gradient pathway by additively forming and experimentally observing a plurality of distinct gradient layers for undesirable compositional phases.

In still yet other embodiments, the methods and systems include determining the compositional gradient pathway by using a solid state diffusion technique to test a plurality of distinct gradient layers for undesirable compositional phases.

In still yet other embodiments, the methods and systems include inserting at least one additive material, that is one of either insoluble or has a melting temperature higher than the processing temperature, into said compositional gradient transition region to form a composite structure.

In still yet other embodiments, the methods and systems include cooling at least one of the layers of said article at a cooling rate sufficient to form one of either an amorphous or nanocrystalline structure within said layer. In some such embodiments, the cooling includes a technique selected from the group consisting of quenching, increasing the deposition velocity of the layer, and blowing gas over the layer.

In still yet other embodiments of the methods and systems, the distinct materials have at least one mechanical or thermophysical property that is distinct and divergent from each other.

In still yet other embodiments of the methods and systems, the at least one divergent mechanical or thermophysical property is selected from weldability, hardness, toughness, ductility, magnetism, crystalline structure, melting temperature, amorphous nature, density, monolithic or composite nature, elasticity, fracture toughness, fatigue limit, corrosiveness, oxidizability, catalytic properties, reactivity, electrical properties, cellular nature, resistivity, dielectric constant, modulus, Poisson ratio, reflectivity, processing temperature, thermal conductivity, heat capacity, magnetic susceptibility, and tensile strength.

In still yet other embodiments of the methods and systems, the distinct materials are selected from elemental metals, metal alloys, oxides, ceramics, glasses, metallic glasses, cellular materials, and composite materials.

In still yet other embodiments of the methods and systems, the distinct materials and the gradient transition regions are selected from stainless steel to Fe64Ni36, Fe—Ni—Cr stainless steel to Fe—Ni alloy, Fe—Ni—Cr stainless steel to Fe, Fe—Ni—Cr stainless steel to Ni, Fe—Ni—Cr stainless steel to Cr, metals to refractory metals, stainless steel to non-stainless steel, between distinct aluminum alloys, Ti alloys to refractory metals, Ti alloys to other metals, shape memory alloys to non-shape memory metals and alloys, Fe or Fe alloys to Fe alloys containing one of Co, Ni, Cu, Al, Cr, Zr, Ta, V, Nb and Ti, between precious metals and precious metal alloys, between solder alloys, and metal to carbide.

In still yet other embodiments of the methods and systems, the article is selected from jewelry, optics, solders, silencers, rocket nozzles, flexures, compliant mechanisms, valve stems, knives, watches, biomedical implants, ceramic inserts, gears, electronic cases, golf clubs, tools, metal pipes, bullets, ballistic armor, body armor, guns, jet engine components, car engine components, cellular structures, magnetic motors, and switches.

BRIEF DESCRIPTION OF THE DRAWINGS

The description and claims of the current invention will be more fully understood with reference to the following figures and data graphs, which are presented as exemplary embodiments of the invention and should not be construed as a complete recitation of the scope of the invention, wherein:

DETAILED DESCRIPTION OF THE INVENTION

Figure 1:
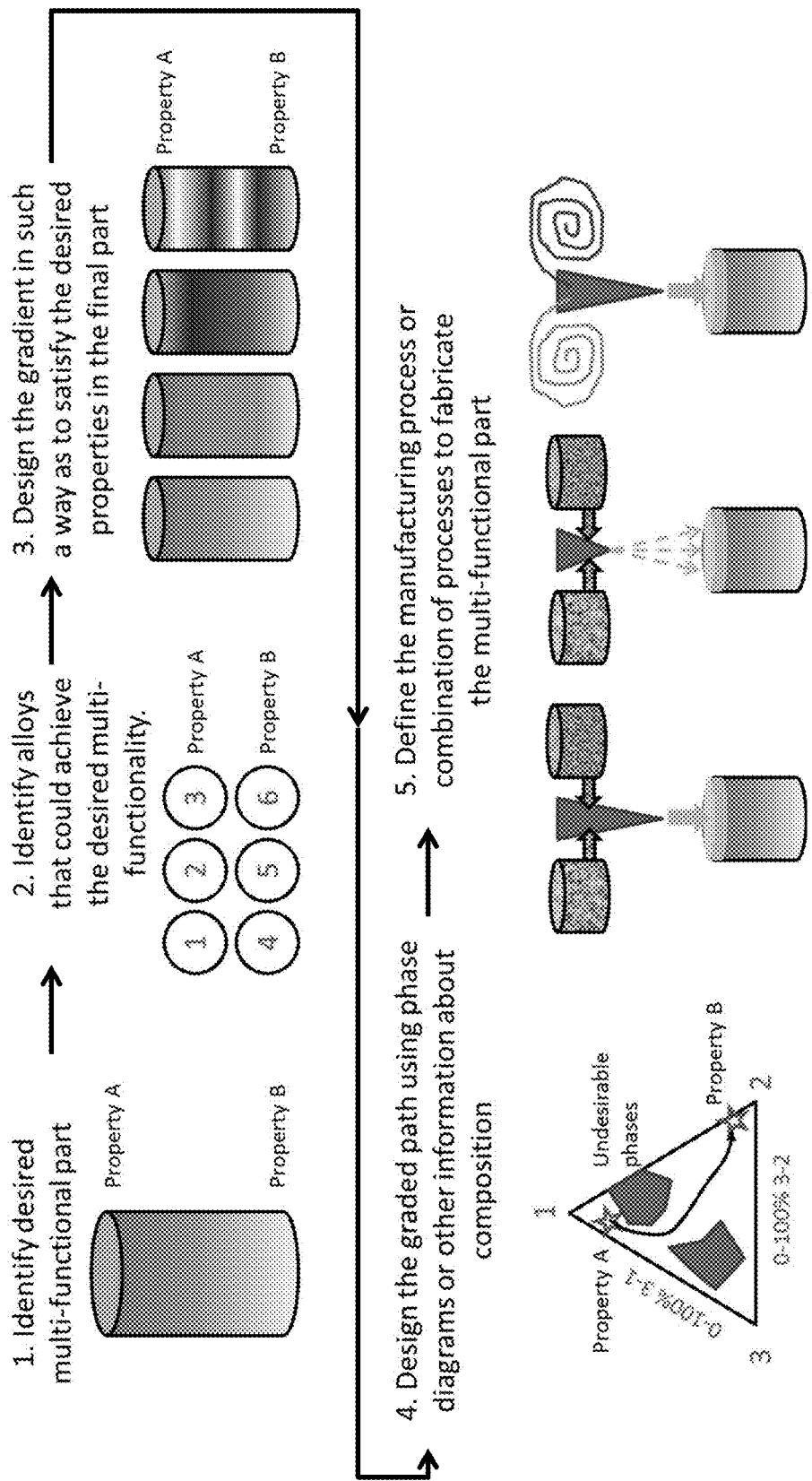
FIG. 1 provides a flow-chart of a generalizable gradient fabrication process in accordance with embodiments of the invention.

Turning now to the drawings, systems and methods for fabricating multi-functional multilayer articles comprised of additively formed gradient materials are illustrated.

A-multi-functional multilayer article, is any part or article of manufacture where a combination of mechanical or thermophysical properties is required that exceeds the capabilities of traditional machining, casting or coating such that the only way to access the desired or required functionalities is to form the part or article of multilayers of distinct graded materials. In some embodiments, examples of possible applications include:

Jewelry or watches—where a gradient between different precious metals (Ag, Au, Pd, Pt), or precious and non-precious metals might be desired.

Optics—where a gradient from low thermal expansion materials such as invar (FeNi) to other more workable metals (such as, for example, Al, Ti or steels) might be desired.

Solders—where the properties of the solder from one part to another, such as, for example, different melting properties (by mixing low melting temperature eutectic alloys) might be desired.

Silencers—where a tube having high melting temperatures (such as Nb) at the center and low density on the exterior (such as Al or Ti) is optimal.

Rocket nozzles—where the nozzle is made from a refractory metal (Ta or Nb) that transitions into the body of the rocket, which could be made from a low-density material (such as Ti) would be ideal.

Compliant mechanisms or flexures—Flexures have extremely small features and rely on the material properties of the struts to flex. A complex flexure might be required where each strut or flex, or different portions of the strut or flex are manufactured with varying properties depending on the metals being deposited.

Valve stems—where a high melting temperature steel in the chamber and a more standard steel outside the chamber where the high melting temperature is not needed (such as a gradient from 304L to Inconel steel) would be desirable.

Knives—where a gradient from a tough material on the backside of the blade to a hard material near the blade edge, such as with steel alloys and Ti alloys, would be desirable.

Biomedical implants—where different materials might be needed for different parts of the body, such as, for example, blending a Ti alloy for a low-density structural support to a Ta alloy for a wear-resistant hip joint.

Carbon Fiber Inserts—These are threaded metal parts that fit into carbon fiber structures to allow for items to be bolted to the carbon fiber. The insert needs to match the thermal expansion of the carbon fiber or it may pull out at low temperatures, which would thus require a gradient of thermal expansions within the part.

Gears—where very hard and wear resistant teeth are needed, but where such materials are not needed at the center of the article.

Golf clubs—where a multi-functional material with high hardness at the surface but high toughness in the bulk could be accomplished with a gradient of steel alloys, Ni alloys and/or Ti alloys.

It should be understood that the above-described multi-functional articles are only meant to be exemplary. In many embodiments, multi-functional articles may be taken to mean any article of manufacture that could be improved by the inclusion of two or more distinct physical or thermophysical properties. For example, though the above listing provides examples where it is essential or important to the function of the article to provide multi-functional material regions, in some embodiments a multi-functional article may include articles where new capabilities could be obtained by providing the multi-functional material regions, such as, for example, Electronic Cases—where making gradient cell phone cases or computer laptop cases could allow for multi-functional mechanical properties that are not possible with other materials.

Tools—where making tools with multi-functional properties would simply be very useful, or improve the operation of the tool (e.g., by improving the tools hardness, strength, density, etc.)

Metal pipes—where by additively manufacturing a gradient onto a rotating cylinder, gradient pipes with high hardness or corrosion resistance could be provided.

Bullets—where customized bullets could be fabricated with gradient alloys that can change density or composition to allow for unique properties when impacting a target. For example, they could be designed to mushroom on impact or to keep sharp on impact depending on the gradient used.

Vehicle Ballistic Armor—where by thermal spraying a gradient alloy into a plate or panel, a low-density material could be graded into a hard and impact resistance material, making a more effective armor.

Body armor—where by making a gradient from a soft and ductile metal to a hard metal on the outside of the armor, the function of the armor would be improved. Specifically, the hard material would function to stop the incoming bullet while the soft material would deform to prevent penetration.

Guns—where by additively manufacturing, the net-shape of the gun can be printed at the same time as the gradient, allowing the body of the gun to have density or melting temperature tunable depending on the need.

Jet engine components—where high temperature graded components could be fabricated for jet engines that allow applications that are not possible currently.

Car engine components—where high temperature, complex geometries, or multi-functionality are all things desired in high-performance engine parts.

Cellular Structures—where the additive manufacturing process would allow for the creation of complex cellular structures or foams that could be used for energy absorbing structures with tunable properties.

Magnetic motors—where the gradient can be applied by alternating magnetic and non-magnetic materials to form a magnetic motor.

Switches—where the gradient can be used instead of a solenoid or a switch, and the actuation can be accomplished via the application of current or temperature.

In short, any article that requires or would be improved by layered material multi-functionality across any two regions, whether surface-to-surface or bulk-to-bulk may be considered a multi-functional article in accordance with embodiments of the invention.

In turn, as highlighted above, the gradient materials that form the multi-functional articles may include any gradient of two or more metals or alloys into which compatibility may be engineered and that, when combined allow for a operative multi-functional transition as described above. Some useful gradient combinations in accordance with some embodiments include:

Stainless steel 304L or 316L transitioning to Invar 36 (Fe64Ni36). This gradient can be useful to, for example, change thermal expansion, as Invar 36 has near-zero thermal expansion.

Fe—Ni—Cr-based stainless steel transitioning to Fe—Ni alloys, pure Fe, pure Ni or pure Cr.

Metals to refractory metals. These include transitions from Ti, Zr, Hf, Fe to V, Nb, Ta, W. This gradient can be useful to change the melting temperature, the hardness and the density in the gradients since refractory metals (V, Nb, Ta and W) are dense, hard and high melting temperature.

Stainless steel to non-stainless steel or ductile gray iron. Gradient alloys of this type can be useful to transition between all steel alloys.

Aluminum alloys to aluminum alloys, such as, for example, Al6061 to Al7075 or Al2024.

Ti alloys to refractory metals, which could include pure Ti, Ti-6Al-4V, beta Ti alloys and other Ti-based alloys transitioning to V, Nb, Ta, W.

Ti alloys to other metals, such as, for example, Ti alloys transitioning to Zr and Hf.

Shape memory alloys transitioning to refractory metals or pure elements. For example, Nitinol (NiTi) or CuZr shape memory alloys can be transitioned (Nitinol can transition to Ni or Ti-alloys, while CuZr can transition to Cu or Zr.) This gradient can be useful to transition from a shape memory property to a material that does not exhibit that property.

Pure Fe or Fe-alloys can be transitioned to Fe-alloys containing >10% of Co, Ni, Cu, Al, Cr, Zr, Ta, V, Nb, Ti.

Precious metals, where gradients can be formed between, Au, Ag, Pd and Pt, which can be useful to create specialized jewelry from gradients.

A pure element to an alloy based in that element, which could include Fe alloys that transition to Fe, Ni alloys to Ni, Cu alloys to Cu, Zr alloys to Zr, Ti alloys to Ti, Al alloys to Al, Mg alloys to Mg, etc.

Solder alloys, where gradients can be used for low melting temperature alloys used in solders to change the properties of the solder. These could include gradients between Pd, Sn, In, Sb, Ag, Bi, As, Ga, Ge, etc.

A gradient that transitions from an amorphous metal to a crystalline or nanocrystalline metal. These could, in some embodiments, include amorphous metals based in Fe—P, Fe—Ni—P, Fe—Ni—B, CuZr, Cu, Zr, ZrCuAlNi, HfCuAlNi, NiTiCuAl, NiTi, PdP, NiP, ZrTiBe, TiBe or ZrBe that transition into crystalline metals.

A gradient from a metal to a carbide (e.g. Ti to TiC or SiC).

As briefly discussed above, in some embodiments the gradient material may include multiple transitions or uses multiple materials. For example, in some embodiments it may be required that the gradient goes through several different materials. For example, this could include grading from Ti or Ti-alloys to Fe or Fe-alloys by going through an intermediate material, such as, for example, Zr, Nb, V or Ta.

In some embodiments, gradient materials could also include forming a composite structure using the gradient. This could be a metal-matrix-composite, where one phase grows from the liquid during cooling, or an ex-situ composite where particles are not melted by the laser. A metal-matrix-composite can be formed by melting alloys that are insoluble, such as adding B to FeNi alloys, or by adding Be to Ti and Zr alloys. An ex-situ metal-matrix-composite can be made by adding high melting temperature particles during the additive manufacturing process, such as SiC or BC. In some embodiments, such a composite structure may include where the additive manufacturing process produces a graded alloy that contains two or more discrete phases (in addition to the gradient of composition). For example, in some embodiments, the phases can be in the form of dendrites, spheres, particles, or small powder.

These gradient materials, in turn, may be formed using any suitable additive process that allows for the engineering of the layered compositional gradients needed to prepare the discrete and distinct property regions within the multi-functional article, as well as the compositional gradient region that provides a compositional transition between the distinct regions. In some embodiments, these additive techniques may include:

Laser Engineered Net Shaping (LENS) or Laser Deposition, where the gradient is achieved by melting metal or alloy powders using a laser and the net-shape is achieve through a computer-controlled rastering head. In embodiments of LENS, the gradient materials may be formed using a number of related sub-techniques, including where:

The gradient can be formed by mixing metal alloy powder.

The gradient can be formed by mixing individual elemental powder.

The gradient can be deposited vertically throughout the part.

The gradient can be applied radially by using a rotating work base.

The gradient can be applied to a part build off of a metal substrate.

The gradient can be applied to an existing part fabricated via conventional metallurgy techniques (e.g. casting, machining, forging).

The gradient can be applied in compositional increments from 1% to 100%.

Monolithic material can be strategically embedded in the part during the LENS process to yield specific mechanical, electrical or thermophysical properties.

The gradient can be applied to a non-metal (glass, ceramic or plastic).

Wire-fed freeform where wires of different elements or alloys are fed into a melting unit and the gradient is achieved through a computer-controlled rastering head. In embodiments of wire-fed freeform, the gradient materials may be formed using a number of related sub-techniques, including where:

Two or more wires can be introduced into the melting head.

The melting head can melt the metal using an electron beam, a laser, or radio frequency heating.

The wires can be any diameter between 1 micron and 6 mm.

Ultrasonic additive manufacturing (UAM) where metallic sheets are welded together ultrasonically with a computer-controlled head and the sheets are trimmed with a CNC. In embodiments of UAM, the gradient materials may be formed by welding in layers of different metals or alloys as the part is being constructed. In such embodiments, if X is one deposited layer of metal tape "A" and Y is one deposited layer of metal tape "B" then a gradient may be similar to XXXXYXXXYXXYX-YYYY.

Sintering blended powders and then HIP'ing to remove porosity. In embodiments of sintering, the gradient materials may be formed using a number of related techniques, including where:

The gradient is fabricated using a Direct Laser Sintering Process (DLSP). In this technique, a thin layer of powder is brushed over a substrate and the laser melts the powder to form one layer of the gradient. A small amount of a different metal powder is added to the original powder to slightly change its composition, that powder is brushed over the first deposited layer and the laser melts that layer. Eventually, the part will be functionally graded from one composition to another.

The gradient is fabricated by filling a mold with powder (plus a binder) that blends from one composition to another and then the part is sintered to convert the powder into a graded composition. The gradient compact is HIP'ed to remove porosity.

Thermal spray coating where the gradient is achieved by the mixing of wires or powders as they enter a thermal spray gun. The composition of the thermal spray can be continuously graded by controlling the wire or powder that enters the gun. In embodiments of thermal spray coating, the gradient materials may be formed using a number of related techniques, including where:

The gun can be computer controlled to build up a gradient vertically to form a plate.

The gradient can be formed radially by spraying the gun onto a rotating part.

A net-shaped gradient can be formed by spraying the gun into a mold that can be removed later. The mold can be made from metal, plastic, ceramic, or sand.

The gradient can be formed into curved panels by spraying it onto a template. This could be used to make armored door panels, for example, where a gradient from steel to a harder alloy is required for ballistic protection.

A coating process where the gradient alloys are subjected to a cycle of dipping and cooling in baths of molten metal with changing composition. In such embodiments, the gradient can be obtained by dipping a part into a bath of molten metal to form a layer, cooling the part slightly to solidify the layer, and then dipping in a bath with a slightly different composition to form another layer. The gradient will be built slowly by this additive process.

Creating composites where the gradient is formed by the introduction of a second phase that slowly changes volume fraction. In embodiments of such second phase forming, the gradient materials may be formed using a number of related techniques, including where:

Using a laser deposition process and adding increasing amounts of material to an additive manufacturing process that doesn't fully melt but becomes a second phase in the melt pool. For example, a Ti part being built up during the printing can have SiC particles added to it, which increase in volume fraction from one side of the part to the other.

The composite is controlled by chemical desegregation during cooling from the liquid. This involves making alloys with insoluble elements.

The final part can have a matrix that is a non-graded alloy (such as Ti, for example), and the volume fraction of the second phase is graded (such as carbides or dendrites).

The final part can be a matrix that has a gradient of composition but that also contains second phase particles either in a constant volume fraction or in a gradient volume fraction.

Finally, although the gradient materials listed in the claims above could be manufactured using the listed techniques, or some other additive manufacturing process, there is also the possibility that a new or modified processing technique could also produce them. It should be understood that to the extent such a fabrication process is capable of forming multi-functional articles from an engineered gradient of materials, such a technique could also be incorporated into embodiments of the inventive fabrication process.

The fabrication of any particular functional gradient is not trivial. Much work has been done in the field in attempting to create functionally graded alloys. These include blending from one metal alloy or element to a different alloy or element in small increments, depositing one metal onto a different metal in a "step" of composition and creating claddings of one metal onto another. These works are generally presented as "special cases" arrived at by "trial and error". No attempt has been made to formalize a coherent method for creating such functionally graded materials, much less a multi-functional article utilizing a desired functional gradient material.

Turning now to FIG. 1, embodiments of a fabrication process for manufacturing multi-functional multilayer articles comprised of two or more distinct materials via a compositional gradient region are described.

In a first step, it is necessary to identify the desired properties in the final multi-functional multilayer part. Accordingly, in some embodiments the fabrication process starts by identifying the desired combination of mechanical or thermophysical properties that the final part must possess for the gradient process, and that the combination of properties required exceeds what could be accomplished by machining, casting or coating, or would be improved by the current process. Some examples include:

- An article that requires two difficult to weld metals to be joined, where the multi-functional portion of the article would be a gradient between the difficult to weld metals and/or alloys that enables them to be conventionally welded on both sides.
- An article that requires a transition from a soft metal or alloy to a harder metal or alloy.
- An article that requires a transition from a tough and ductile metal or alloy to a strong and brittle metal or alloy, such as, for example, knives which require a tough material on the back side of the blade and a hard material near the blade edge.
- An article that requires a transition from a metal or alloy with a particular coefficient of thermal expansion (CTE) to a different CTE or one that has zero thermal expansion, such as, for example, an optical mount.
- An article that requires a transition from a metal or alloy that is ferromagnetic to a metal or alloy that is non-ferromagnetic.
- An article that requires a transition from a metal or alloy with a particular crystal structure to another metal or alloy with a different crystal structure (example, face centered cubic to hexagonal).
- An article that requires a transition from a metal or alloy with a particular ductile-to-brittle-transition to another metal or alloy that does not exhibit such a transition.
- An article that requires a transition from a metal or alloy with a low melting temperature to a metal or alloy with a high melting temperature.
- An article that requires a transition from a crystalline metal or alloy to a metal or alloy that is fully amorphous (a metallic glass).
- An article that requires a transition from a metal or alloy with a low density to a metal or alloy with a high density.
- An article that requires a transition from a monolithic metal or alloy to a composite metal or alloy (a metal matrix composite, for example).
- An article that requires a transition from a metal or alloy with low-elasticity to a metal or alloy with high elasticity. metal or alloy with low fracture toughness to a metal or alloy with
- An article that requires a transition from a high fracture toughness.
- An article that requires a transition from a metal or alloy with a low fatigue limit to a metal or alloy with a high fatigue limit.
- An article that requires a transition from a metal or alloy with some particular corrosion properties to a metal or alloy with different corrosion properties.
- An article that requires a transition from a metal or alloy with particular oxidation properties to a metal or alloy that doesn't oxidize.
- An article that requires a transition from a substrate to a metallic column with a different metal or alloy at the tip, which can be used as a growth catalyst.
- An article that requires a transition through a series of different metals or alloys that have different reactions when exposed to a particular environmental condition (gas, liquid, temperature, etc.).
- An article that has localized areas of magnetism or other thermal or electrical properties.
- An article that requires a transition from a metal or alloy with certain electrical properties to a material with different properties (as from a conductor to an insulator, for example).
- An article that requires a transition from a monolithic metal or alloy to a cellular metal or alloy (a foam, for example).
- An article that requires a transition through a series of different metals or alloys all connected by a gradient.
- An article that requires a transition from a metal or alloy to a glass (oxide glass).
- An article that requires a transition from a metal or alloy with a low resistivity to a metal or alloy with a high resistivity.
- An article that requires a transition from a metal or alloy with a low dielectric constant to a metal or alloy with a high dielectric constant.
- An article that requires a transition from a metallic glass with one composition to a metallic glass with a different composition.
- An article that requires a transition from a metal or alloy with a low modulus to a metal or alloy with a high modulus (from a stiff metal to a flexible metal, for example).
- An article that requires a transition from a metal or alloy with a low Poisson's ratio to a metal or alloy with a high Poisson's ratio.
- An article that requires a transition from a metal or alloy with a particular reflectivity to a metal or alloy with a different reflectivity.
- An article that requires a transition from a metal or alloy with a high processing temperature to a metal or alloy with a low processing temperature.
- An article that requires a transition from a metal or alloy with low thermal conductivity to a metal or alloy with high conductivity.
- An article that requires a transition from a metal or alloy with a low heat capacity to a metal or alloy with a high heat capacity.
- An article that requires a transition from a metal or alloy with a low magnetic susceptibility to a metal or alloy with a high magnetic susceptibility.
- An article that requires a transition from a metal or alloy to a ceramic.

Although a partial list of possible multi-functionalities is provided above, the potential reasons for multi-functionality in a part are virtually endless, and are not all listed here. However, multi-functionalities all fall into the same reasoning; multiple functions are identified where there is a single part or article that requires different mechanical, thermophysical, etc. properties, and all of those functions can be achieved by blending distinct metals/metal alloys/non-metals with different inherent properties (either by gradient or by localization) to exploit specific local behavior, and the portion of the part where the graded functionality is to be engineered is of a geometry where it can be fabricated by a suitable 3D dimensional additive printing process.

In a second step of the fabrication process shown in FIG. 1, a specific compositional gradient must be identified. More particularly, at least two distinct elemental metals, metal alloys, ceramics, composites, etc. must be identified that exhibit the mechanical, thermophysical, etc. properties required by the multi-functional application. It will be understood that there may be many possible combinations and configurations of metals and metal alloys that yield the exact same desired properties in the final part.

In a third step of the fabrication process shown in FIG. 1, the "composition space" of a selected metal/metal alloy combination must be examined, and a suitable compositional gradient trajectory or pathway mapped that will form the compositional gradient transition region between the distinct materials selected in step two. In particular, it is not possible to simply add one metal to another and make a solid alloy free of defects. When transitioning from one metal to another, many new compositions may be formed. A "compositional gradient path or trajectory" must be developed to avoid the formation of undesirable compositional phases, such as, for example, phases that might be formed during the 3D printing process that would embrittle one or more regions of the article.

In some embodiments, such a gradient trajectory may be determined by navigating suitably dimensioned (binary, ternary, etc.) phase diagrams to avoid the formation of brittle phases (often intermetallic phases). More specifically, it has been determined that for any desired gradient, the actual compositional trajectory can be engineered by references to such compositional phase diagrams (which are widely available for most elements). The phase diagrams indicate the crystal phases present at certain temperatures for 0-100% mixing of each element in the diagram. In cases where gradient compositions are required, not just adhesion of one layer to another, the initial and final compositions can be mapped to avoid forming an unwanted phases. This allows for an engineered transition from a composition with a known mechanical or physical property to a different composition with different properties through one or more graded compositional transition regions that are free from undesired defects.

For example, in the case of a pure metal transitioning to a different pure metal, binary phase diagrams offer insight into such things as the solubility of the component metals within one another and the formation of intermetallic compounds and secondary phases. For example, a ternary phase diagram of Fe and Ti (shown in FIG. 1) reveals a number of undesirable intermediate phases between the two pure metals, some of which are brittle intermetallic phases. Creation of these phases in the gradient would cause cracking under conditions of thermal stress, owing to the brittle nature of the phases. As will be described in greater detail in the Exemplary Embodiments, gradients between two metallic elements (Ti and V), and also between two metal alloys (Stainless Steel 304L and Invar 36) have been demonstrated, thus showing how the fabrication process can be used to successfully to avoid unwanted phases.

Figure 2:
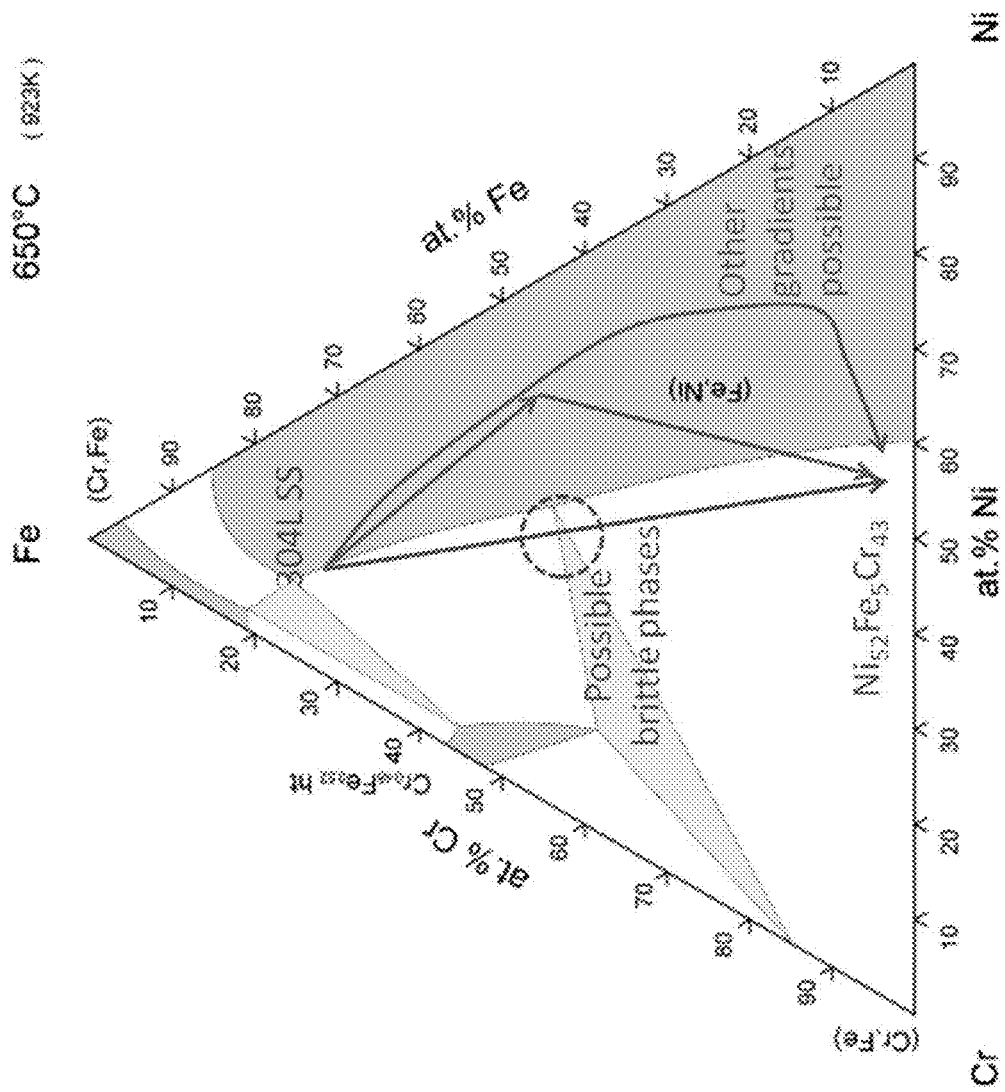
FIG. 2 provides a diagram of an exemplary ternary phase diagram for the gradient transition from 304L stainless steel to a NiCrFe alloy in accordance with embodiments of the invention.

For graded materials with more than 4 elements, lesser elements can be neglected when phase diagrams indicate that there is solubility or no phases present from small additions of that element. For example, 304L stainless steel is comprised of many elements, including Fe, Ni, Cr, Mn and Si, but is primarily Fe, Ni, Cr. In such a case, as shown in FIG. 2, a ternary phase-diagram of Fe—Ni—Cr can be used to create a gradient trajectory from 304L to some other composition that will approximate all negative phases with great accuracy. Indeed, as shown in FIG. 2, a ternary phase diagram of Fe, Cr and Ni reveals a number of undesirable intermediate phases between the 304L stainless steel and Ni52Cr43Fe5, some of which are brittle intermetallic phases. Creation of these phases in the gradient would cause cracking under conditions of thermal stress, owing to the brittle nature of the phases. However, using this approximated ternary phase diagram a compositional gradient pathway from 304L to the NiCrFe alloy can be mapped to ensure that these undesirable compositional phases are avoided. (In FIG. 2, acceptable pathways are shown by the segmented and curved arrows.) Likewise, as the concentration of one element is decreased to a minimal level, another ternary phase diagram can be used. For example, a gradient from Fe—Ni—Cr to Nb could be created by combining graded paths from multiple phase diagrams (e.g., Fe—Ni—Cr, Fe—Ni—Nb, and Fe—Nb).

A number of specific techniques for mapping compositional gradient trajectories arises from these observations that can be incorporated into embodiments of the fabrication process, including:

Forming a gradient composition by following a line in a binary or ternary phase diagram to get from one composition to another.

Using a binary phase diagram to select gradient compositions that avoid brittle phases. As an example, the Ti—Nb phase diagram shows no brittle phases.

Using a continuous line or a curve in a ternary phase diagram to go from one alloy composition to another along that path.

Using a segmented line or curve in a ternary phase diagram to create a discontinuous path between one alloy composition and another that avoids the formation of brittle phases.

Simplifying an alloy with >3 components into a 3 component alloy, based on the principal constituents, so that a ternary phase diagram can be used to select a gradient path.

Experimentally determining a gradient composition by progressively adding an element or an alloy to a different element or alloy through an additive manufacturing process until visible cracking is observed.

Using solid-state diffusion experiments to design gradient compositions that avoid brittle phases. Reacting metals under temperature and pressure can create gradients through diffusion. These can be studied to identify compositions.

Forming a gradient by using a computer program to convert a path through a phase diagram into a discrete set of compositions that can be additively manufactured into the gradient alloy.

Building a quasi-phase diagram of more than three elements to determine a suitable path for a gradient to travel.

It should be understood that in designing the compositional gradient trajectory, which will be embodied in the final part in the one or more compositional transition regions between the distinct materials, a number of layering techniques may be used, including:

Forming the gradient by transitioning from one material or a different material by compositional increments between 0.1 and 50%. For example, a gradient from Ti to Nb would progress as one layer of 100% Ti then 99.9% Ti-0.1% Nb, then 99.8% Ti-0.2% Nb and so on.

Forming gradients where the width of one gradient layer can be between 1 micrometer and 1 centimeter.

The gradient can transition from one material to another material and then from that second material to another material and onwards.

A gradient from one metal or metal alloy can be accomplished through the use of one or more intermediate gradient materials to avoid the formation of brittle phases.

Additively manufacturing the gradient can mean that the final part is built up by the addition of one gradient layer at a time until the part is fully transitioned.

The gradient can include a step in composition where there is a transition of 100% in composition between one layer and the next. For example, depositing pure Ti on Fe.

Forming a step-wise gradient where the gradient proceeds to a particular composition, makes a large change in composition, and is then continuous.

Forming a gradient composition by transitioning from one metal to another metal by using multiple transitions. This may be required when many brittle phases exist between two desired alloys, such as Ti to Fe, or Al to Ti. Forming a gradient from two different metals to a mutual metal to form a multiple-step gradient. This could include Ti—V—Fe or Ti—Nb—Fe.

Designing the gradient to have elements that are insoluble or that have sufficiently high melting temperatures that they do not fully melt during the additive manufacturing process such that a gradient is formed with a composite structure.

Designing the cooling rate in the additive manufacturing process such that the alloy being deposited can be cooled into an amorphous or nanocrystalline structure. This can be done by quenching, increasing the deposition velocity, or by blowing gas over the sample.

In a fourth step, as shown in FIG. 1, once a compositional gradient trajectory has been identified a suitable additive manufacturing process capable of producing the desired multi-functional part is selected. In some cases there may be many ways of manufacturing a multi-functional graded part and in others there may be only one suitable technique. The selection of the manufacturing process depends on the complexity and orientation of the part and the locations where the gradient alloys are applied to achieve the desired multi-functional properties.

For example, depending on the functionality required, the part can manufactured by, among others, (a) Laser Engineered Net Shaping (LENS) laser deposition process using the blending of multiple elemental or alloy powders; (b) an electron beam freeform process where the gradient is achieved by blending wires of different elements or alloys and melting them with an electron beam (or laser); (c) a thermal spraying process where multiple powders or wires are introduced into the gun; (d) a direct laser sintering process where gradient powders are sintered together by a laser and then heat-treated to remove porosity; (e) an ultrasonic additive manufacturing process (UAM) where metal tape of different metals or alloys are joined using ultrasonic pulses; (f) an additive process where some portion of the part is either machined or cast from a metal alloy and then the gradient composition is applied by one of the aforementioned processes; and (g) a combination of two or many of the aforementioned processes.

In summary, multiple manufacturing processes can be utilized, either individually or in combination, to form a final part that has a net or near-net shape with multi-functionality through the use of multiple materials by engineering a gradient or localized deposition along a suitable gradient compositional trajectory.

Although the above has focused on systems and methods for forming multifunctional articles, it should be understood that embodiments of the invention are also directed to novel multifunctional articles formed by they systems and methods. Some examples of multifunctional articles are provided below.

Exemplary Embodiments

The person skilled in the art will recognize that additional embodiments according to the invention are contemplated as being within the scope of the foregoing generic disclosure, and no disclaimer is in any way intended by the foregoing, non-limiting examples.

EXAMPLE 1

Multi-Functional Optical Mounts

Nearly all JPL spacecraft (as well as satellites and high-flying aircraft) such as the Laser Interferometer Space Antenna (LISA) and some dark programs contain optical assemblies. These complex assemblies have high-precision requirements that necessitate the use of low coefficient of thermal expansion (CTE) materials (e.g. Invar) to support the actual optics (i.e. optics mount). The mount is often machined from a single piece of Invar (an Fe—Ni alloy which exhibits a near zero-CTE). Invar is a tough and ductile metal, but it is difficult to machine and has a density similar to steel.

In these applications, the Invar mount is typically supported by a "bench". The bench is often machined from Al or Ti alloys, to reduce density, or from steel, for strength. These structures are generally assembled together using fasteners but, in some constructions, adhesives or brazes may be used to join the dissimilar metals. Due to the CTE mismatch between dissimilar materials, thermal excursions can lead to misaligned optics, performance degradation, and reduced reliability. Using embodiments of the techniques described herein to form a multi-functional optical mount having a low or zero CTE material, such as, for example, Invar in contact with the optics, and a standard workable material, such as, for example, Al or Ti alloys on the other, it would be possible to reduce the number of interfaces required to manufacture enable high-reliability direct laser welding of optical packaging structural components, eliminate complex machining, allow prediction and control of the CTE, and reduce assembly mass and complexity.

Figure 3A:
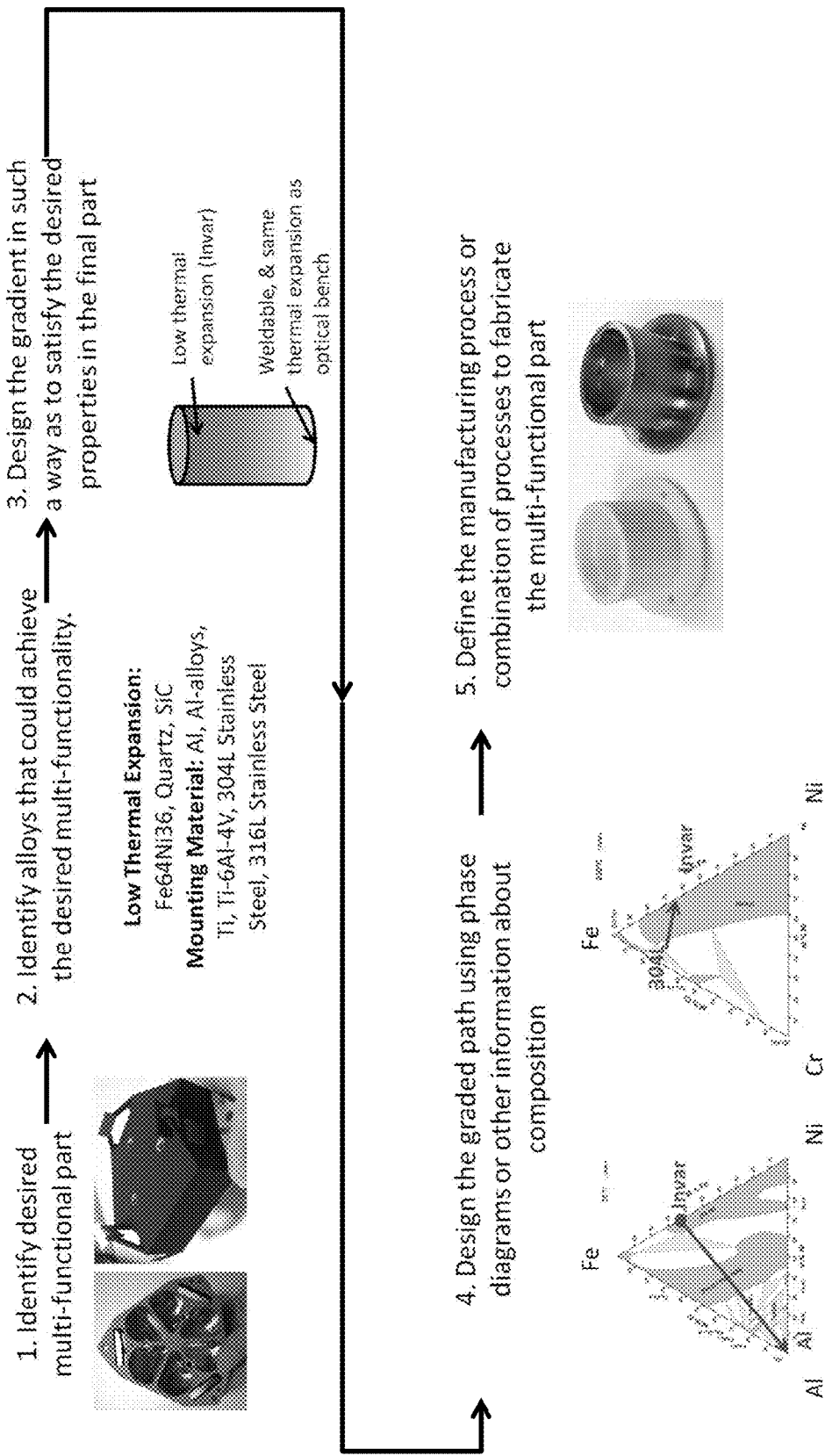
FIG. 3a provides a flowchart of an exemplary 304SS to Invar gradient fabrication process and its use in forming a multi-functional mirror mount in accordance with embodiments of the invention.

As shown in FIG. 3a (Step 1), metal mirror mounts are complex metal parts that must have tabs, flexures, cutouts and mounting holes. Using the steps described above it is possible to first identify the multi-functional nature of the part, namely, that the side of the mirror mount holding the glass mirror needs to have low thermal expansion to match the thermal expansion of glass, while the side that mounts to the optical bench needs to match the bench material to avoid thermal expansion mismatch and to allow for welding. Based on current instrument packages, it is also possible to determine a set of appropriate materials around which a gradient could be created, namely an Fe—Ni alloy (Invar 36) that has low thermal expansion for the optical mount, and a bench side made of Al, Ti or stainless steel. (FIG. 3a, Steps 2 to 3)

As discussed, determining the desired properties and appropriate materials are necessary, but not sufficient, steps in creating a multi-functional optical mount article. It is also necessary to determine whether it is possible to engineer a compositional gradient between the two materials that will not result in an intermetallic compound or secondary phase with inoperative properties. For example, ternary phase diagrams provided in FIG. 3a, Step 4, show that a linear gradient transition from Fe—Ni—Cr (the simplified composition of 304 stainless steel) to Invar 36 can be engineered without hitting any brittle phases, however a similar transition from Invar 36 to Al would include phases that would embrittle the article.

Once a compositional gradient trajectory has been determined, it is then possible to select an additive technique capable of engineering the gradient. (FIG. 3a, Step 5) In the case of the optical mount shown in FIG. 3a, the mount could be designed to not have any overhanging sections, and then could be completely built using an additive deposition technique such as LENS. Alternatively, the parts of the mount that do not require gradients could be traditionally machined and the gradient can be applied to the machined part via an additive process.

Figure 3B:
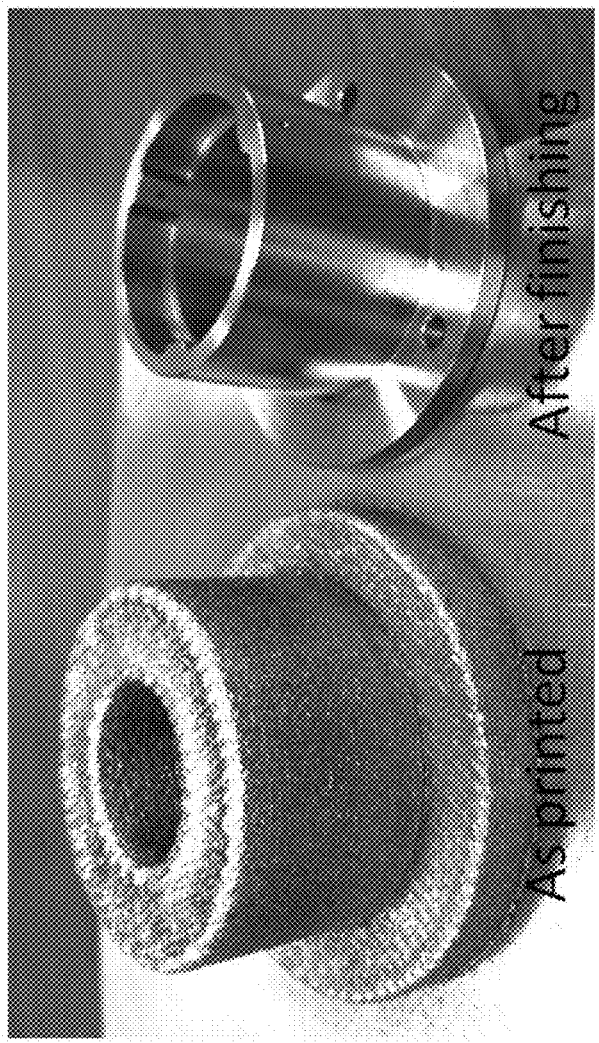
FIG. 3b provides an image of a multi-functional mirror mount in accordance with embodiments of the invention.
Figure 3C:
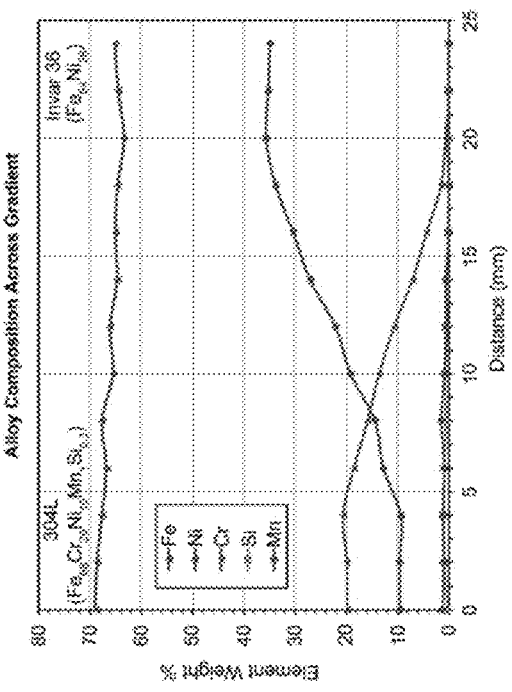
FIG. 3c provides a data plot showing a gradient alloy composition along a dimension of the mirror mount in accordance with embodiments of the invention.
Figure 3D:
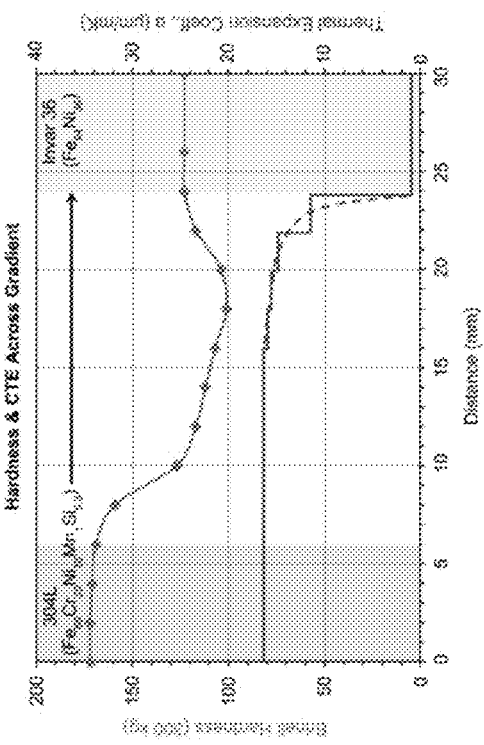
FIG. 3d provides a data plot showing the hardness of the mirror mount along a dimension of the mirror mount in accordance with embodiments of the invention.

As shown in FIG. 3b, using the method a multi-functional multilayer mirror mount was formed onto which an Ag-coated glass mirror was then mounted. A plot of the compositional gradient region as a function of distance is provided in FIG. 3c to show, for this embodiment, how the compositional gradient was actually formed. This exemplary embodiment demonstrates at least two novel features of the exemplary multi-functional article fabrication process. In particular, as shown in the data plot in FIG. 3d, Invar 36 has nearly a zero coefficient of thermal expansion (CTE) while 304L does not. (FIG. This gradient is therefore very useful for applications where one side of a part cannot expand or contract with changing temperature while the other side can.) Specifically, this gradient is useful for the fabrication of optical mounts for spacecraft. The Invar side holds the glass optics, which do not shrink at cold temperatures while the steel side can be conventionally welded to a bench, eliminating the need for fasteners and thus reducing mass and enhancing reliability. Moreover, the 304L-Invar gradient also has very unique magnetic properties. Stainless steel is non-magnetic while Invar is very magnetic. Therefore, the gradient demonstrates a transition between two very leveraging properties for commercial applications, zero CTE and zero ferromagnetism. Accordingly, the final net-shaped part has low thermal expansion on one side, can be welded to steel on the other side, and the graded composition diffuses the thermal expansion mismatch to avoid cracking.

EXAMPLE 2

Multi-Functional Optical Mirror

Figure 4A:
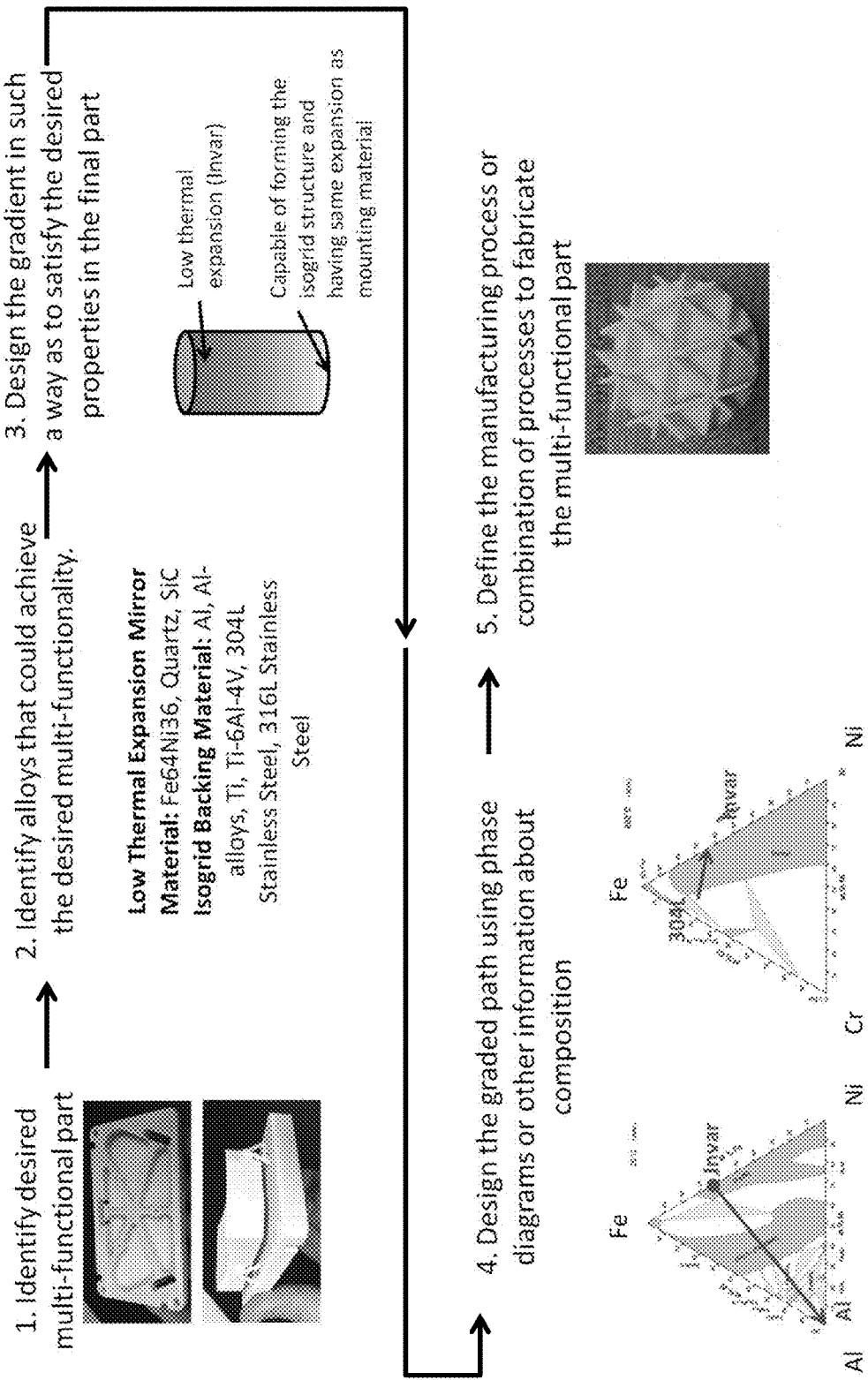
FIG. 4a provides a flowchart of an exemplary 304SS to Invar gradient fabrication process and its use in forming a multi-functional mirror in accordance with embodiments of the invention.
Figure 4B:
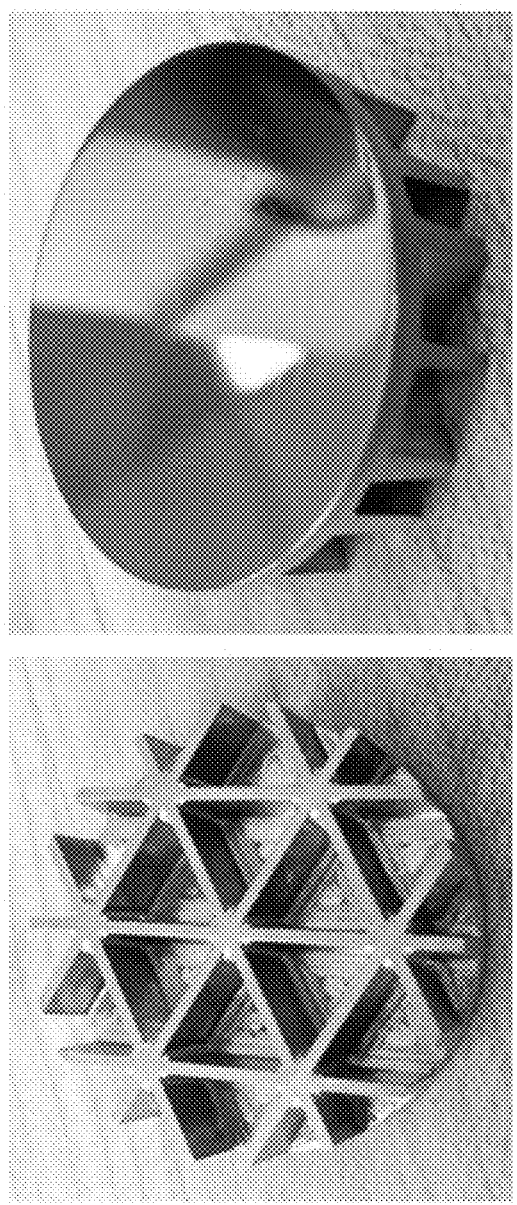
FIG. 4b provides an image of a multi-functional mirror in accordance with embodiments of the invention.

As shown in FIGS. 4a and 4b, using the same compositional gradient described in Example 1, above, a multi-functional multilayer optical mirror comprising a Invar 304L mirror and an isogrid backing was also formed, demonstrating that the multi-functional CTE system can be incorporated both into optical mounts, and directly into the optics themselves.

EXAMPLE 3

Multi-Functional Valve Stem

Figure 5A:
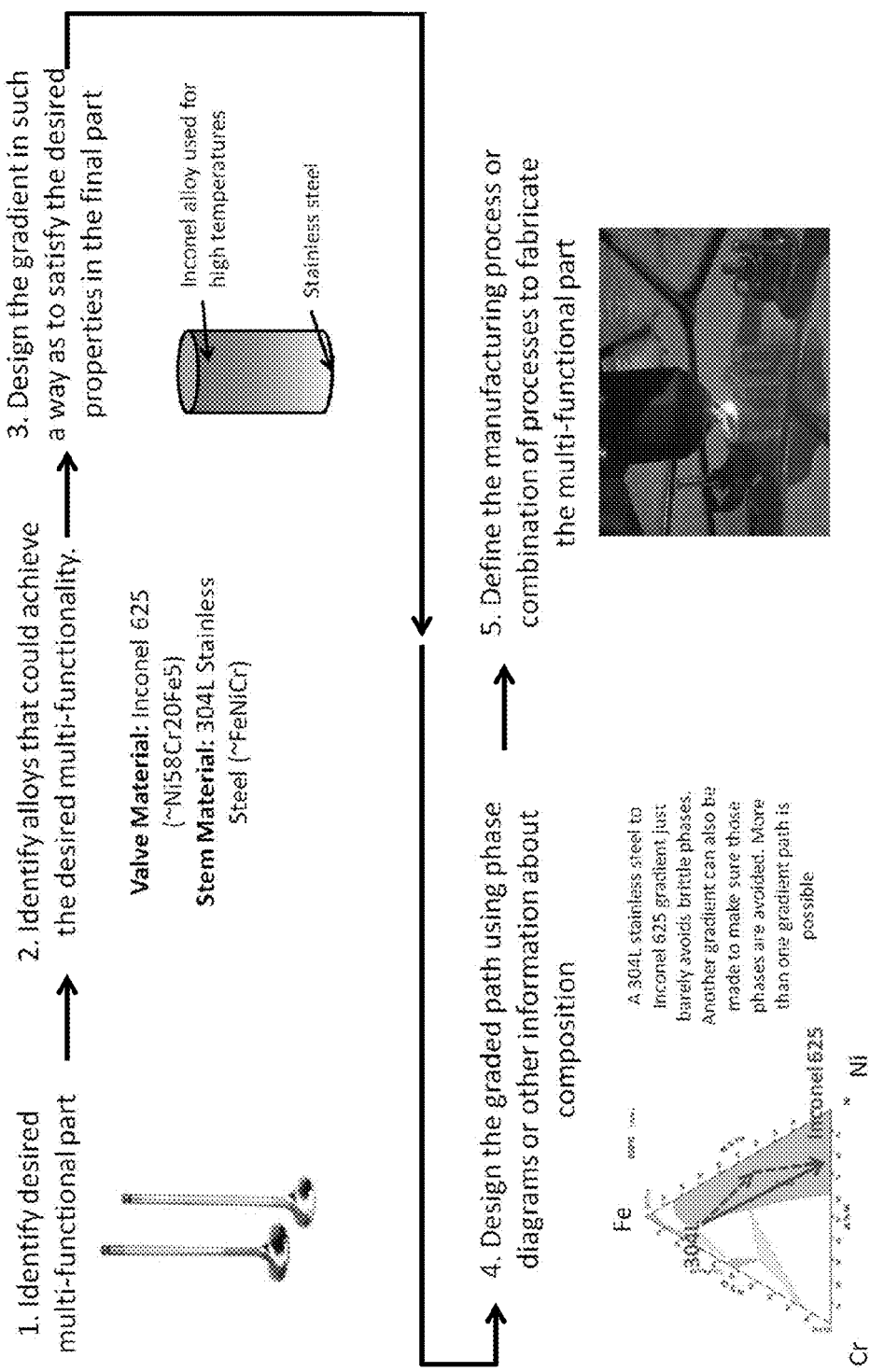
FIG. 5a provides a flowchart of an exemplary Inconel 625 to 304SS gradient fabrication process and its use in forming a multi-functional valve stem in accordance with embodiments of the invention.
Figure 5B:
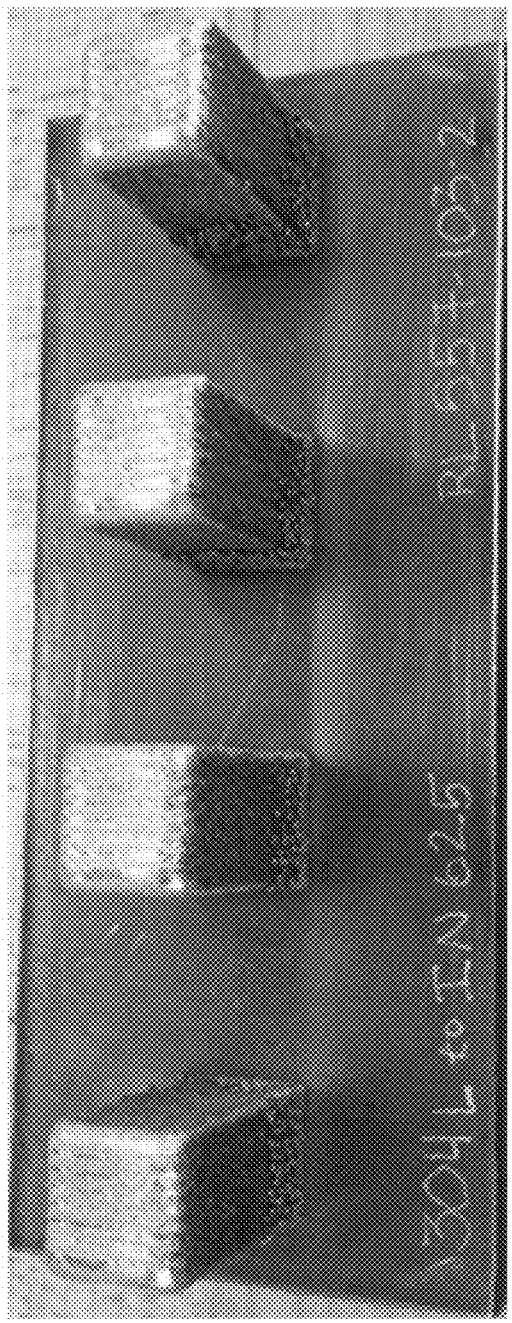
FIG. 5b provides an image of a multi-functional valve stem in accordance with embodiments of the invention.

As shown in FIGS. 5a and 5b, in some embodiments the fabrication process may be used to form multi-functional multilayer valve stems. Again, in this embodiment the shape of the part is determined first (FIG. 5a, Step 1), followed by an identification of appropriate materials (Step 2) and the necessary distinct material regions (Step 3). In this case, the materials are a high temperature Inconel 625 (reduced composition of Ni58Cr20Fe5) alloy for the valve material, and a traditional 304L Stainless Steel stem material. Then a compositional gradient pathway is plotted between the two materials (Step 4). As shown, a straight-line path only barely avoids an embrittling region. Accordingly, in some embodiments a multi-step compositional gradient pathway (shown by the dashed line) that passes through an intermediate material stage may be used. Once the pathway is defined, the manufacturing technique is identified (FIG. 5a, Step 5), and the part fabricated. In this instance, as shown in FIG. 5b multiple pathways were taken to show that when an improper gradient pathway is chosen, embrittlement and cracking might occur (arrows).

EXAMPLE 4

Multi-Functional Rocket Nozzle

Figure 6A:
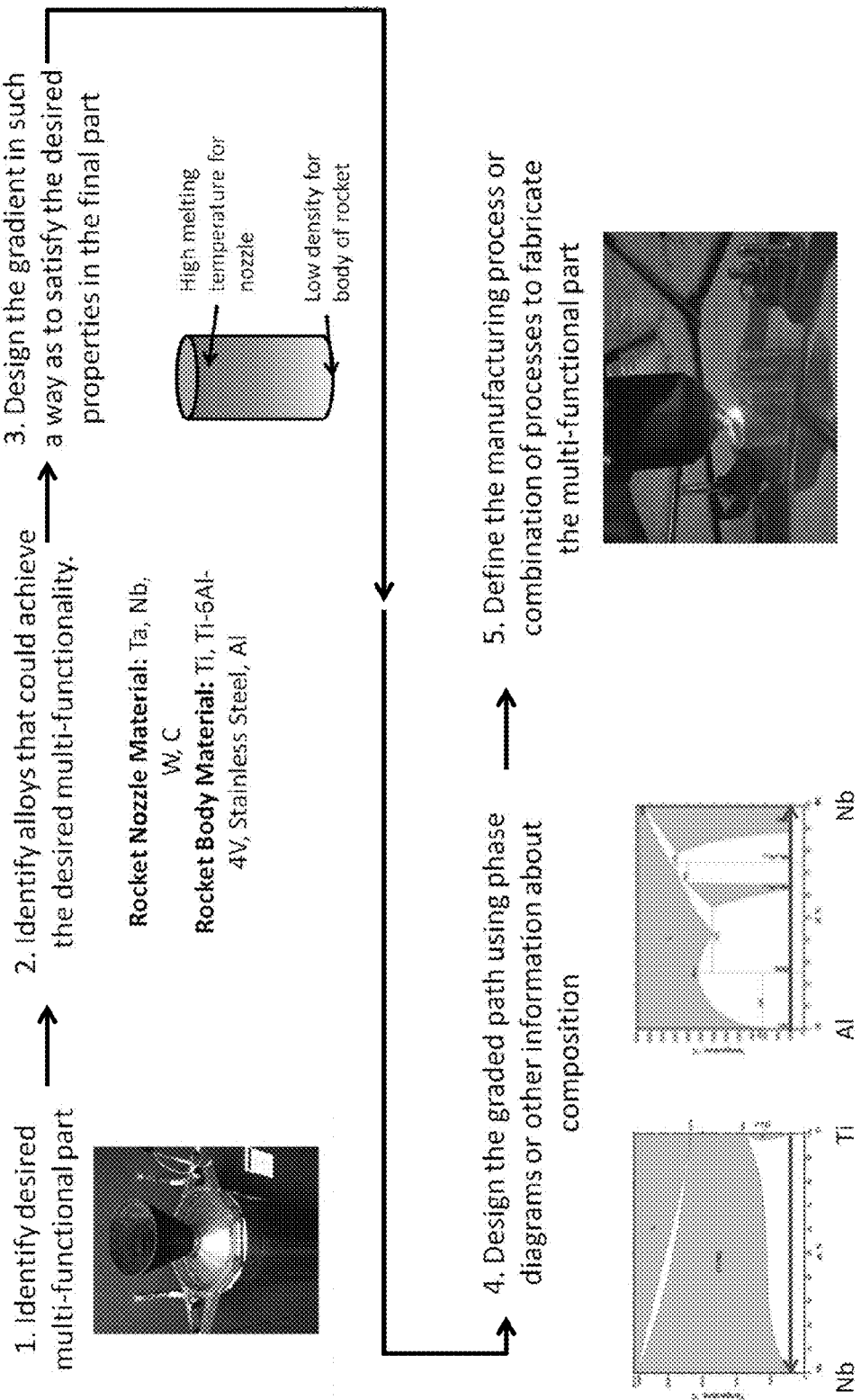
FIG. 6a provides a flowchart of an exemplary Ti/Ti alloy to Nb gradient fabrication process and its use in forming a multi-functional rocket nozzle in accordance with embodiments of the invention.
Figure 6B:
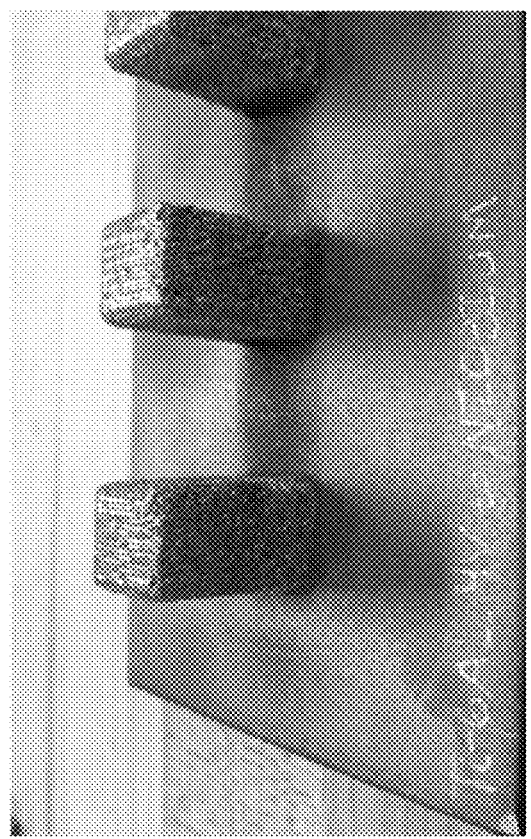
FIG. 6b provides an image of a multi-functional rocket nozzle in accordance with embodiments of the invention.
Figure 6B:
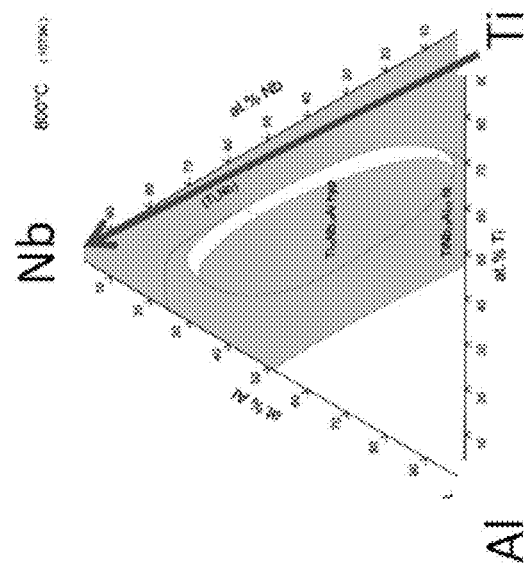

As shown in FIGS. 6a and 6b, in some embodiments the fabrication process may be used to form multi-functional multilayer rocket nozzles. As before the shape of the article is determine (Step 1), the distinct materials identified (in this case a high melting temperature metal such as Ta, Nb, W, C for the rocket nozzle material, and a low density material such as Ti, Ti-alloy or stainless steel material for the rocket body, Step 2 & 3), and then the compositional gradient pathway determined (Step 4). As shown a Ti to Nb compositional gradient crosses no undesirable phases, whereas an Al to Nb compositional gradient would. Then the fabrication process is selected (FIG. 6a, Step 5) and the part fabricated. In this case, because Ti powder is difficult to source, a Ti-alloy (Ti-6Al-4V) was used instead. The compositional gradient pathway and formed part are shown in FIG. 6b.

EXAMPLE 5

Multi-Functional Weld Segment

Figure 7A:
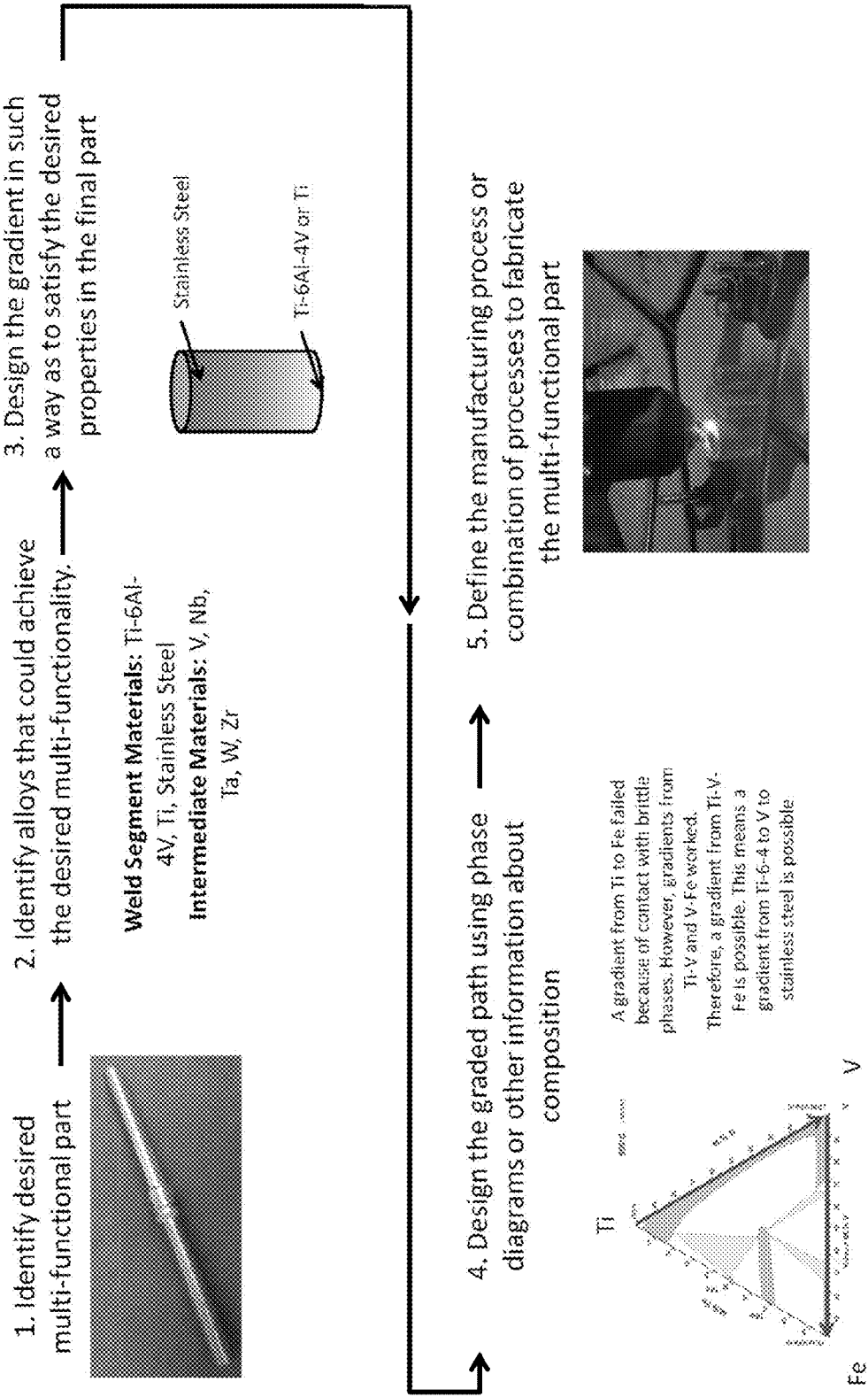
FIG. 7a provides a flowchart of an exemplary Ti/Ti alloy to stainless steel gradient fabrication process and its use in forming a multifunctional weldable segment in accordance with embodiments of the invention.
Figure 7B:
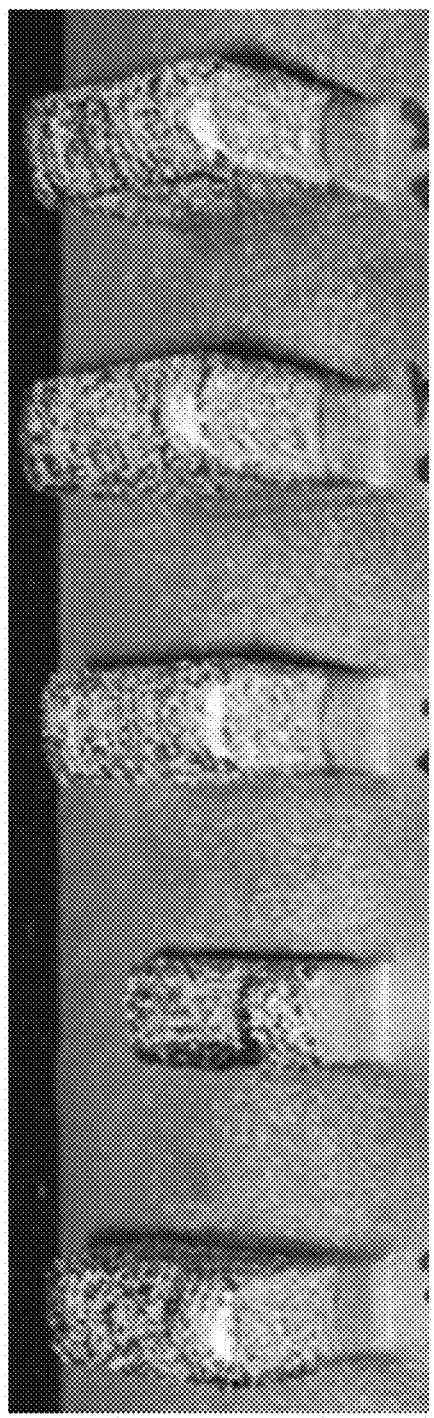
FIG. 7b provides an image of a multi-functional weldable segment in accordance with embodiments of the invention.

As shown in FIGS. 7a and 7b, in some embodiments the fabrication process may be used to form multi-functional multilayer weldable segments capable of allowing a weld to be formed between Ti and steel. As before the shape of the article is determine (Step 1), the distinct materials identified (in this case a weldable metal such as stainless steel, and a non-weldable to steel material such as Ti or Ti-alloy, Step 2 & 3), and then the compositional gradient pathway determined (Step 4). As shown a direct gradient from Ti to Fe would fail because of the number of undesirable embrittling phases therebetween. In practice, these phases actually cause cracking and failure when Ti is graded to Fe. Accordingly, intermediate materials, such as V alloys of Ti and steel like Ti—V and V—Fe may be used to create a multistep compositional gradient pathway between Ti or Ti-6-4 and stainless steel. Then the fabrication process is selected (FIG. 7a, Step 5) and the part fabricated (FIG. 7b).

EXAMPLE 6

Ti to V GRADIENT ARTICLE

Figure 8A:
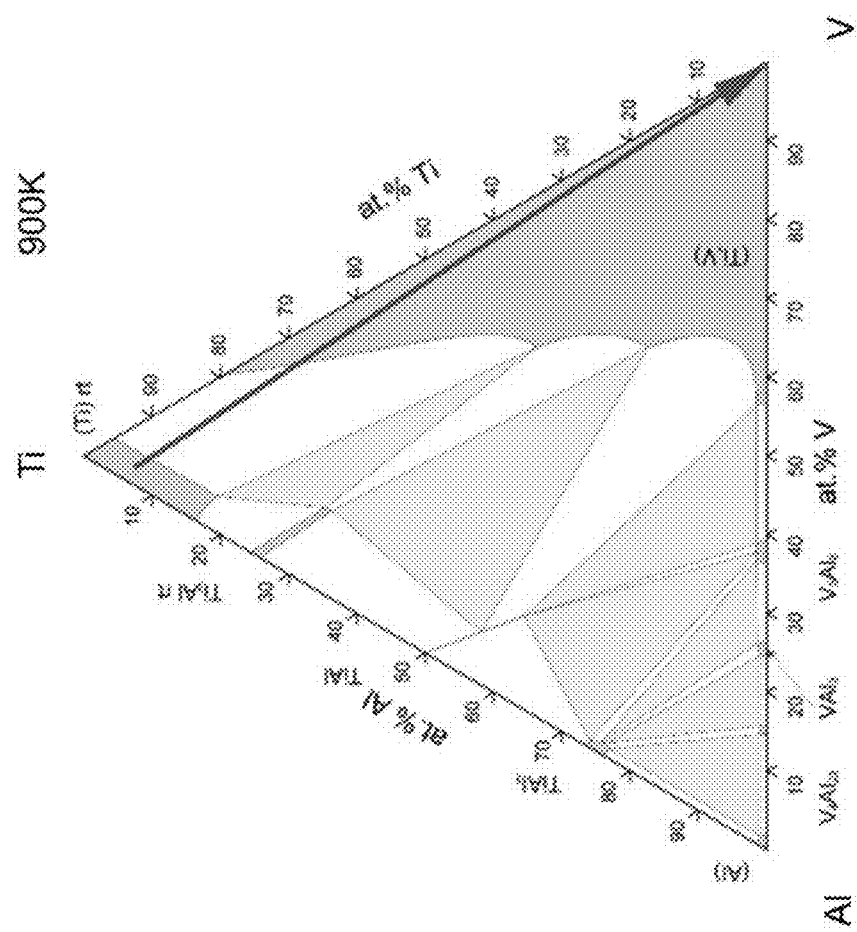
FIG. 8a provides a data plot of an exemplary Ti to V gradient alloy in accordance with embodiments of the invention.
Figure 8B:
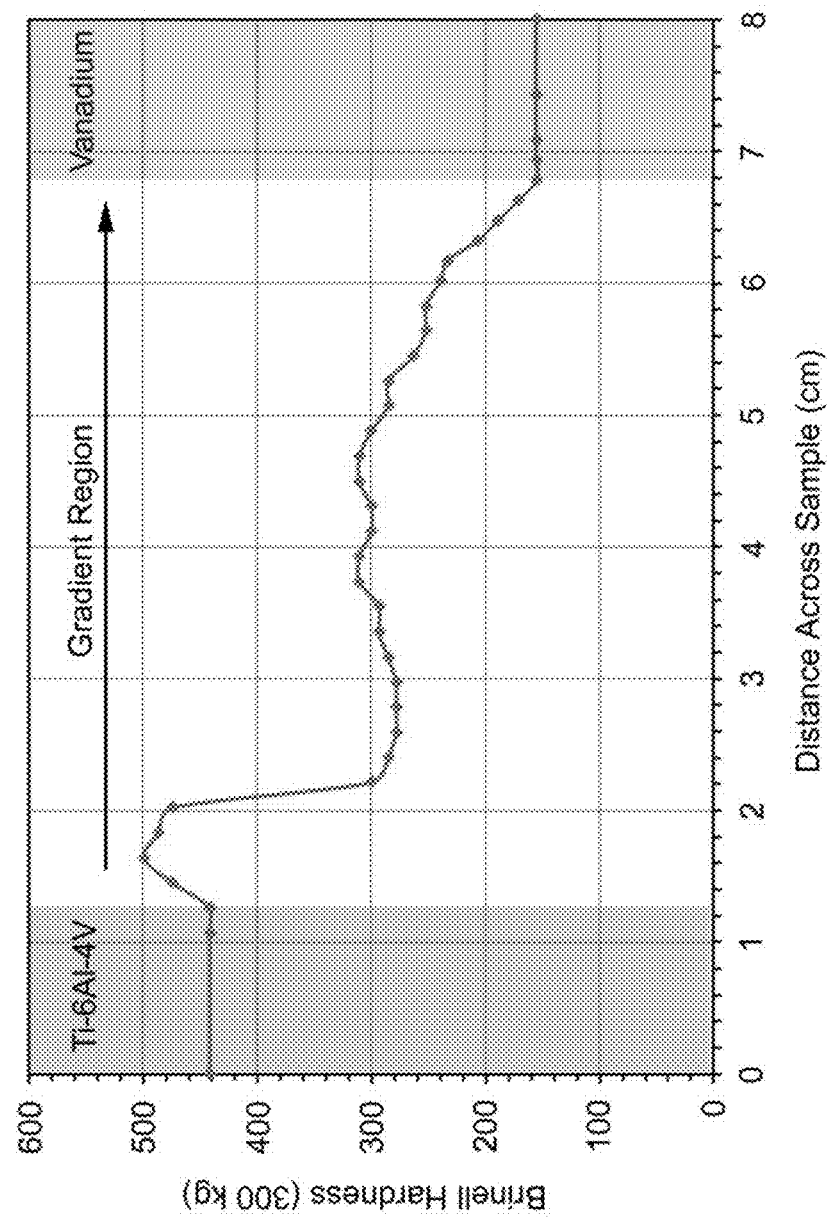
FIG. 8b provides a data plot of the hardness of an exemplary Ti to V gradient alloy in accordance with embodiments of the invention.
Figure 8D:
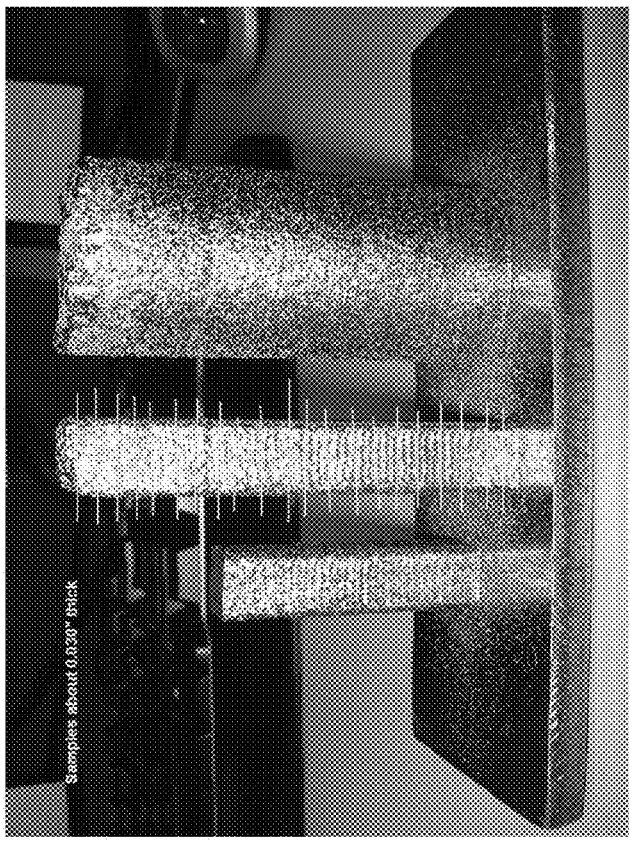
FIGS. 8c and 8d provide images of a multi-functional article formed with the alloy described in FIGS. 8a and 8b in accordance with embodiments of the invention.
Figure 8C:
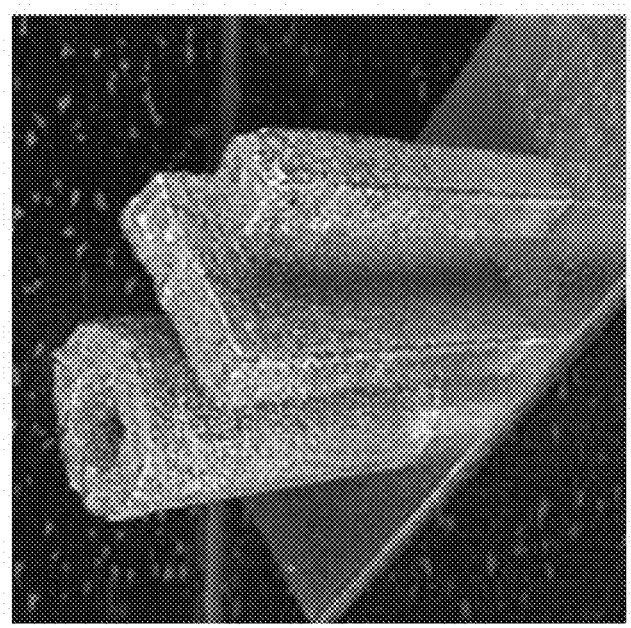

As shown in FIGS. 8a to 8d, a Ti to V gradient alloy was fabricated through LENS by following the compositional gradient pathway shown in FIG. 8a. To create the gradient from titanium (Ti) to vanadium (V), pure titanium powder is initially introduced into the laser to begin building up the hardware. At the desired point, vanadium powder is introduced into the laser through a different nozzle than that delivering the titanium powder and at a rate defined by the user to control the composition of the alloy being deposited. The volume fraction of vanadium is increased as new layers are deposited until the part is pure vanadium. In the gradient, the composition is an alloy of Ti and V specified by the volume or mass fraction of each. In other words, each composition in the binary phase diagram between Ti and V is produced in gradient steps. In the exemplary demonstration, as shown in FIG. 8b, steps of 3% in composition were applied. Monolithic parts from alloys ranging in composition from 100% Ti to 100% V in steps of 3% were fabricated, as shown in FIGS. 8c and 8d. It should be noted that FIG. 8d shows a side view of the part with each of the multilayers of the composition gradient transition region marked to provide a visual indication of the type of multilayer construction used.

This Ti—V gradient demonstrates a transition from a metal alloy to a pure element, but also demonstrates a transition from one crystal structure to another (in this case the hexagonal closed packed Ti-6-4 transitions into body centered cubic V). The gradient also demonstrates a wide variety of other potentially leveraging properties. Compared to pure V, Ti-6-4 is harder, lower density, higher strength, lower melting temperature, lower fracture toughness, more machinable, and less prone to oxidation. The gradient therefore demonstrates a transition from one material property to another, significantly in the aforementioned cases.

Summary

The fabrication of multi-functional articles using the additive deposition of gradient alloys represents a paradigm shift from the traditional way that metal alloys and metal/metal alloy parts are fabricated. Since a gradient alloy that transitions from one metal to a different metal cannot be fabricated through any conventional metallurgy techniques, the technique presents many novel opportunities. Moreover, the embodiments described above identify a broad range of unique properties and applications. To demonstrate the novelty, two gradient alloys were successfully fabricated. The first is a Ti-6Al-4V to V gradient and the second is a 55304L to Invar36 gradient, both were formed free of cracks, pores or other defects.

While the above description contains many specific embodiments of the invention, these should not be construed as limitations on the scope of the invention, but rather as an example of one embodiment thereof. The embodiments present solutions for overcoming the current inability to fabricate multi-functional articles formed of gradient alloys through traditional metallurgy techniques, and specifically identify fabrication methods for producing multi-functional articles using gradient alloys that allow for commercial applications that are unique to such articles. Specifically, it will be understood that any gradient composition has a broad range of beneficial attributes that can be simply applied to a piece of hardware using the techniques described herein. Moreover, although the above description has focused on a system and method for forming multifunctional articles, it should also be understood that embodiments are directed to multifunctional articles themselves. Accordingly, the scope of the invention should be determined not by the embodiments illustrated, but by the appended claims and their equivalents.

What is claimed is:

1. A method of fabricating a multi-functional multilayer article comprising:
    determining a shape for the article and defining at least two spatially separated regions on said article, said two regions to be formed of at least two distinct materials being joined by at least one compositional gradient transition region;
    mapping a compositional gradient pathway onto said article between said at least two regions such that the at least one compositional gradient transition region substantially excludes any undesirable compositional phases; and
    forming the article, wherein at least the at least one compositional gradient transition region comprises a plurality of distinct gradient layers formed by incrementally adjusting the compositional ratio between the at least two distinct materials.

2. The method according to claim 1, wherein the incremental adjustment between the at least two distinct materials comprises compositional increments between 0.1 and 50%.

3. The method according to claim 1, wherein the at least one gradient transition region comprises a direct compositional transition from one distinct material to another.

4. The method according to claim 1, wherein the at least one gradient transition region comprises a multi-stage gradient wherein the gradient region includes both incremental compositional steps and direct stepwise compositional transitions.

5. The method according to claim 1, wherein the gradient transition region includes transitions to and from a separate distinct material.

6. The method according to claim 1, wherein the width of each gradient layer is between 1 micrometer and 1 centimeter.

7. The method according to claim 1, wherein there are at least three distinct materials each separated by at least one distinct compositional gradient region.

8. The method according to claim 1, wherein there are at least two distinct compositional gradient transition regions between each distinct material.

9. The method according to claim 1, wherein the at least one gradient transition region is formed additively, by the addition of one gradient layer at a time.

10. The method according to claim 9, wherein the additive process is selected from the group consisting of laser deposition, wire-fed freeform, ultrasonic additive manufacturing, sintering blended powders, thermal spray coating, melt pool coating, chemical desegregation, and dip coating.

11. The method according to claim 1, wherein the compositional gradient pathway is determined by plotting a compositional line along a phase diagram of the at least two distinct materials.

12. The method according to claim 11, wherein the line is continuous, and is one of either a straight or a curve line.

13. The method according to claim 11, wherein the line is discontinuous.

14. The method according to claim 11, wherein the phase diagram of a distinct material with greater than three constituents is simplified into a ternary phase diagram based on the three highest concentration constituents of said distinct material.

15. The method according to claim 11, wherein the phase diagram is a quasi-phase diagram representing more than three separate constituents.

16. The method according to claim 1, further comprising determining the compositional gradient pathway by additively forming and experimentally observing a plurality of distinct gradient layers for undesirable compositional phases.

17. The method according to claim 1, further comprising determining the compositional gradient pathway by using a solid state diffusion technique to test a plurality of distinct gradient layers for undesirable compositional phases.

18. The method according to claim 1, further comprising inserting at least one additive material, that is one of either insoluble or has a melting temperature higher than the processing temperature, into said compositional gradient transition region to form a composite structure.

19. The method according to claim 1, further comprising cooling at least one of the layers of said article at a cooling rate sufficient to form one of either an amorphous or nanocrystalline structure within said layer.

20. The method according to claim 19, wherein the cooling comprises a technique selected from the group consisting of quenching, increasing the deposition velocity of the layer, and blowing gas over the layer.

21. The method according to claim 1, wherein the distinct materials have at least one mechanical or thermophysical property that is distinct and divergent from each other.

22. The method according to claim 21, wherein the at least one divergent mechanical or thermophysical property is selected from the group consisting of weldability, hardness, toughness, ductility, magnetism, crystalline structure, melting temperature, amorphous nature, density, monolithic or composite nature, elasticity, fracture toughness, fatigue limit, corrosiveness, oxidizability, catalytic properties, reactivity, electrical properties, cellular nature, resistivity, dielectric constant, modulus, Poisson ratio, reflectivity, processing temperature, thermal conductivity, heat capacity, magnetic susceptibility, and tensile strength.

23. The method according to claim 1, wherein the distinct materials are selected from the group consisting of elemental metals, metal alloys, oxides, ceramics, glasses, metallic glasses, cellular materials, and composite materials.

24. The method according to claim 1, wherein the distinct materials and the gradient transition regions are selected from the group consisting of stainless steel to Fe64Ni36, Fe—Ni—Cr stainless steel to Fe—Ni alloy, Fe—Ni—Cr stainless steel to Fe, Fe—Ni—Cr stainless steel to Ni, Fe—Ni—Cr stainless steel to Cr, metals to refractory metals, stainless steel to non-stainless steel, between distinct aluminum alloys, Ti alloys to refractory metals, Ti alloys to other metals, shape memory alloys to non-shape memory metals and alloys, Fe or Fe alloys to Fe alloys containing one of Co, Ni, Cu, Al, Cr, Zr, Ta, V, Nb and Ti, between precious metals and precious metal alloys, between solder alloys, and metal to carbide.

25. The method according to claim 1, wherein the article is selected from the group consisting of jewelry, optics, solders, silencers, rocket nozzles, flexures, compliant mechanisms, valve stems, knives, watches, biomedical implants, ceramic inserts, gears, electronic cases, golf clubs, tools, metal pipes, bullets, ballistic armor, body armor, guns, jet engine components, car engine components, cellular structures, magnetic motors, and switches.

* * * * *